United States Patent
Han et al.

(10) Patent No.: US 10,261,683 B2
(45) Date of Patent: Apr. 16, 2019

(54) ELECTRONIC APPARATUS AND SCREEN DISPLAY METHOD THEREOF

(71) Applicant: Samsung Electronics Co., Ltd., Suwon-si, Gyeonggi-do (KR)

(72) Inventors: Yonggil Han, Gumi-si (KR); Jinwan An, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 673 days.

(21) Appl. No.: 14/813,923

(22) Filed: Jul. 30, 2015

(65) Prior Publication Data
US 2016/0048320 A1 Feb. 18, 2016

(30) Foreign Application Priority Data

Aug. 13, 2014 (KR) .................. 10-2014-0105169

(51) Int. Cl.
*G06F 3/048* (2013.01)
*G06F 3/0488* (2013.01)
*G06F 3/0481* (2013.01)

(52) U.S. Cl.
CPC ........ *G06F 3/04883* (2013.01); *G06F 3/0481* (2013.01); *G06F 3/04886* (2013.01); *G06F 2203/04108* (2013.01); *G06F 2203/04803* (2013.01)

(58) Field of Classification Search
CPC .... G06F 3/04883; G06F 3/0488; G06F 3/017; G06F 3/0486; G06F 2203/04108; G06F 2203/04803; G06F 3/0481; G06F 3/04886
See application file for complete search history.

(56) References Cited

U.S. PATENT DOCUMENTS

| | | | |
|---|---|---|---|
| 8,600,446 B2 | 12/2013 | Chiang et al. | |
| 2009/0325603 A1* | 12/2009 | Van Os | H04W 4/02 455/456.2 |
| 2011/0191675 A1* | 8/2011 | Kauranen | G06F 3/04847 715/702 |
| 2011/0209088 A1* | 8/2011 | Hinckley | G06F 3/0488 715/810 |
| 2011/0244924 A1 | 10/2011 | Jung et al. | |

(Continued)

FOREIGN PATENT DOCUMENTS

| | | |
|---|---|---|
| KR | 10-2011-0111877 A | 10/2011 |
| KR | 10-2013-0045744 A | 5/2013 |
| KR | 10-2013-0054073 A | 5/2013 |

*Primary Examiner* — Linh K Pham
(74) *Attorney, Agent, or Firm* — Jefferson IP Law, LLP

(57) ABSTRACT

A method of operating an electronic apparatus is provided. The method includes displaying, by an electronic apparatus including a display, a region including at least one of an image, text, and content on a part of a screen of the display, detecting, by the electronic apparatus, a touch or hovering of a user at a first location on or around the region, detecting, by the electronic apparatus, a movement of the touch or the hovering of the user, detecting a second location at which the movement is ended, dividing the screen of the display into two or more portions, and displaying a user interface of an application program related to at least one of the image, the text, and the content on a portion corresponding to the second location among the divided portions.

15 Claims, 32 Drawing Sheets

(56) References Cited

U.S. PATENT DOCUMENTS

| | | | |
|---|---|---|---|
| 2011/0320978 A1* | 12/2011 | Horodezky | G06F 3/0488 |
| | | | 715/823 |
| 2012/0167008 A1* | 6/2012 | Zaman | G06F 3/048 |
| | | | 715/814 |
| 2012/0284673 A1* | 11/2012 | Lamb | G06F 3/04883 |
| | | | 715/863 |
| 2013/0072262 A1* | 3/2013 | Mhun | H04M 1/72552 |
| | | | 455/566 |
| 2013/0120295 A1* | 5/2013 | Kim | G06F 3/01 |
| | | | 345/173 |
| 2013/0346912 A1 | 12/2013 | Buening | |
| 2014/0157148 A1* | 6/2014 | Joo | H04L 51/32 |
| | | | 715/752 |
| 2014/0184544 A1* | 7/2014 | Lim | H04L 51/066 |
| | | | 345/173 |
| 2014/0258182 A1* | 9/2014 | Joung | G06F 17/30943 |
| | | | 706/11 |

* cited by examiner

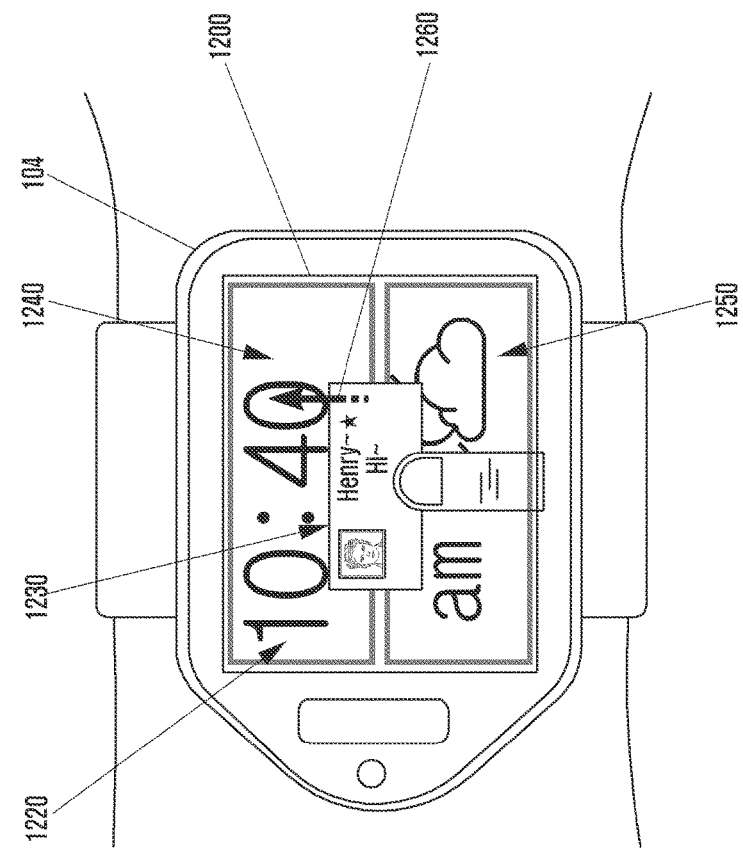
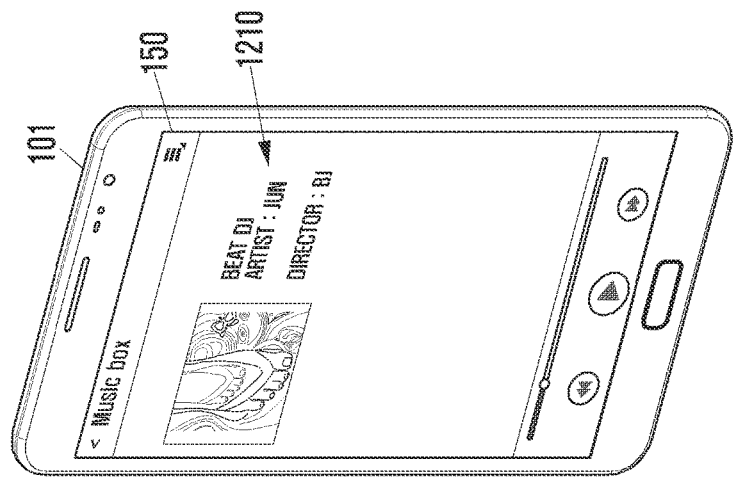
FIG. 12A

FIG. 12B
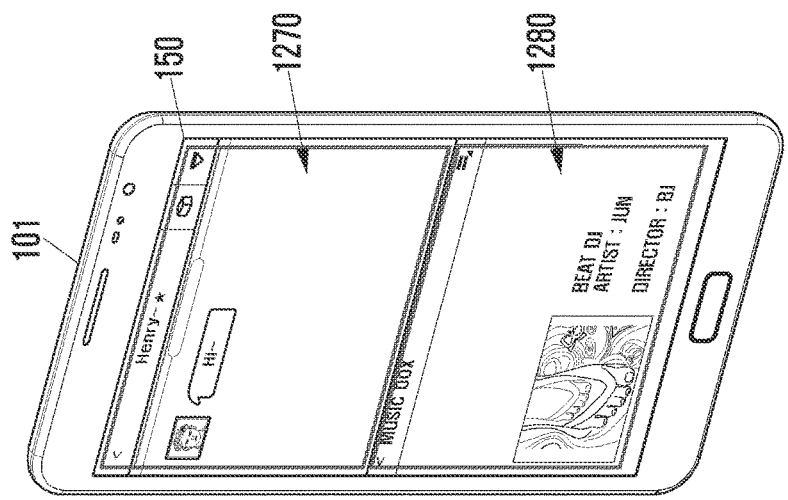
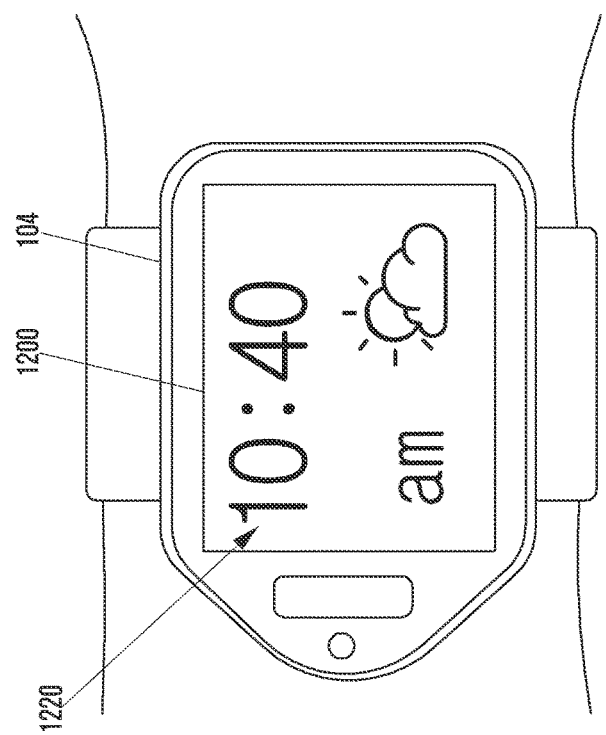

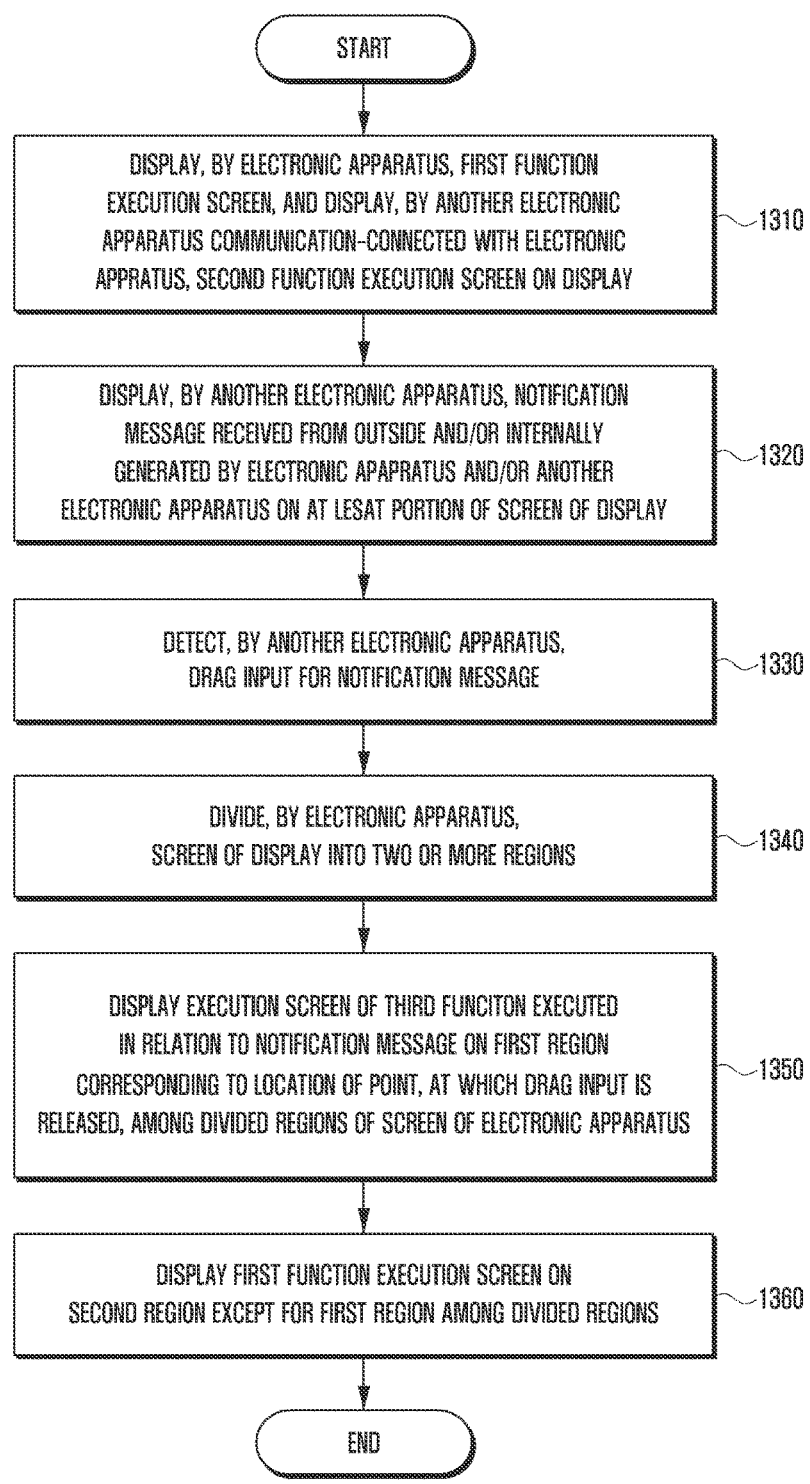

ELECTRONIC APPARATUS AND SCREEN DISPLAY METHOD THEREOF

CROSS-REFERENCE TO RELATED APPLICATION(S)

This application claims the benefit under 35 U.S.C. § 119(a) of a Korean patent application filed on Aug. 13, 2014 in the Korean Intellectual Property Office and assigned Serial number 10-2014-0105169, the entire disclosure of which is hereby incorporated by reference.

TECHNICAL FIELD

The present disclosure relates to a method of displaying executed functions on divided screens, and an electronic apparatus implementing the same.

BACKGROUND

Recently, with the development of digital technologies, various electronic apparatuses including mobile communication terminals, personal digital assistants (PDA), electronic schedulers, smart phones, tablet personal computers (PC), and the like which is capable of performing communication and processing personal information while being carried have come to market. The electronic apparatuses have reached a mobile convergence stage of encompassing areas of other terminals without being confined to their own traditional unique areas.

These electronic apparatuses provide a screen corresponding to function performance in a form of a window. Further, the electronic apparatus may display windows corresponding to performance of a plurality of functions, respectively.

The above information is presented as background information only to assist with an understanding of the present disclosure. No determination has been made, and no assertion is made, as to whether any of the above might be applicable as prior art with regard to the present disclosure.

SUMMARY

In general, when a user executes a first function of an electronic apparatus, and then executes a second function, the electronic apparatus switches a screen executing the first function to a screen executing the second function.

Recently, there has been provided a model, in which a screen is divided and a first function and a second function are executed when the first function and the second function are simultaneously executed, but the user is inconvenienced in that the user needs to select whether to divide a screen, whether to execute the first and second functions, a region among the divided screens for displaying the executed first and second functions, and the like.

Aspects of the present disclosure are to address at least the above-mentioned problems and/or disadvantages and to provide at least the advantages described below. Accordingly, an aspect of the present disclosure is to provide a method of displaying executed functions on divided screens and an electronic apparatus implementing the same.

In accordance with an aspect of the present disclosure, a method of operating an electronic apparatus is provided. The method includes displaying, by an electronic apparatus including a display, a region including at least one of an image, text, and content on a part of a screen of the display, detecting, by the electronic apparatus, a touch or hovering of a user at a first location on or around the region, detecting, by the electronic apparatus, a movement of the touch or the hovering of the user, detecting a second location at which the movement is ended, dividing the screen of the display into two or more portions, and displaying a user interface of an application program related to at least one of the image, the text, and the content on a portion corresponding to the second location among the divided portions.

In accordance with another aspect of the present disclosure, a method of operating an electronic apparatus is provided. The method includes displaying, by an electronic apparatus including one or more displays, a region including at least one of an image, text, and content on a part of a screen of at least one display among the one or more displays, detecting, by the electronic apparatus, a touch or hovering of a user at a first location on or around the region, detecting, by the electronic apparatus, a movement of the touch or the hovering of the user, detecting a second location at which the movement is ended, dividing a screen of a predetermined display among the one or more displays into two or more portions, and displaying a user interface of an application program related to at least one of the image, the text, and the content on a portion corresponding to the second location among the divided portions.

In accordance with another aspect of the present disclosure, a method of operating an electronic apparatus is provided. The method includes displaying, by a first electronic apparatus including a first display, a region including at least one of an image, text, and content on a part of a screen of the first display, detecting, by the first electronic apparatus, a touch or hovering of a user at a first location on or around the region, detecting, by the first electronic apparatus, a movement of the touch or the hovering of the user, detecting a second location at which the movement is ended, dividing, by a second electronic apparatus including a second display, a screen of the second display into two or more portions, and displaying a user interface of an application program related to at least one of the image, the text, and the content on a portion corresponding to the second location among the divided portions.

In accordance with another aspect of the present disclosure, an electronic apparatus is provided. The electronic apparatus includes an input unit configured to detect a touch or a hovering of a user, a display configured to output a screen, a communication unit configured to establish a network with an external apparatus, and a control module configured to display a region including at least one of an image, text, and content on a part of a screen of the display, detect a touch or hovering of a user at a first location on or around the region, detect a movement of the touch or the hovering of the user, detect a second location at which the movement is ended, divide the screen of the display into two or more portions, and display a user interface of an application program related to at least one of the image, the text, and the content on a portion corresponding to the second location among the divided portions.

According to various embodiments of the present disclosure, it is possible to efficiently display a function which is additionally executed in an electronic apparatus together with an existing executed function on divided screens.

Further, it is possible to control a function which is additionally executed in an electronic apparatus to be intuitively displayed on a divided region desired by a user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 12A and 12B are screen example diagrams illustrating a screen display method of the electronic apparatus according to an embodiment of the present disclosure;

FIG. 13 is a flowchart illustrating a screen display method of the electronic apparatus according to an embodiment of the present disclosure.

hroughout the drawings, it should be noted that like reference numbers are used to depict the same or similar elements, features, and structures.

DETAILED DESCRIPTION

Figure 1:
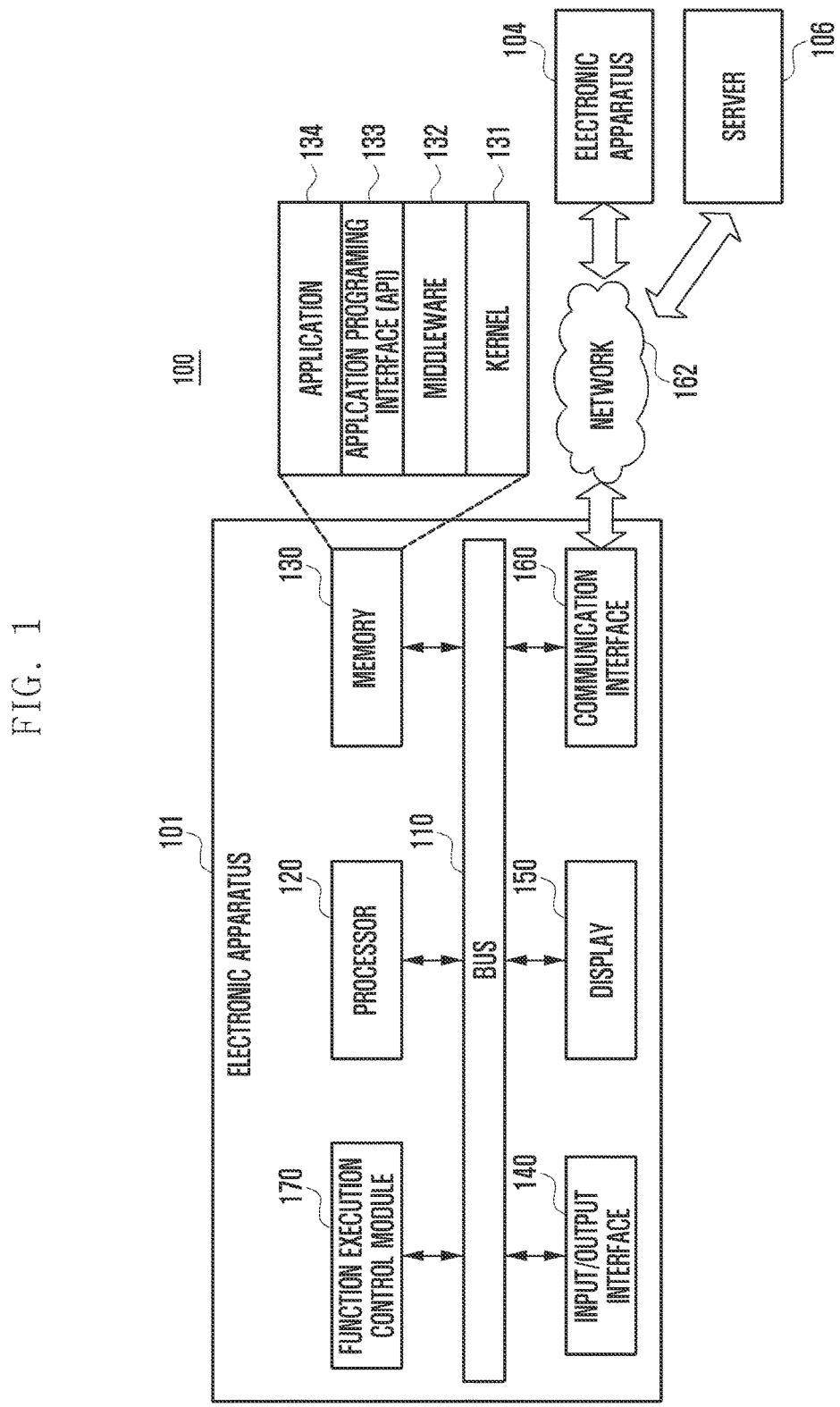
FIG. 1 illustrates a network environment including an electronic apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in the present disclosure, the expression "include" or "may include" refers to the existence of a corresponding function, operation, or constituent element, and does not limit one or more additional functions, operations, or constituent elements. Further, as used in the present disclosure, terms such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Motion Pictures Expert Group (MPEG-1 or MPEG-2) Audio Layer 3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to various embodiments of the present disclosure, the electronic device may be a smart home appliance with a communication function. The smart home appliance as the electronic device, for example, may include at least one of a television (TV), a digital video disc (DVD) player, an audio, a refrigerator, an air conditioner, a vacuum cleaner, an oven, a microwave oven, a washing machine, an air cleaner, a set-top box, a TV box (e.g., Samsung Home-Sync™, Apple TV™, or Google TV™), a game console, an electronic dictionary, an electronic key, a camcorder, and an electronic photo frame.

According to various embodiments of the present disclosure, the electronic devices may include at least one of medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) in a shop.

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to embodiments of the present disclosure may be a combination of one or more of the aforementioned various devices. Further, the electronic device according to embodiments of the present disclosure may be a flexible device. Further, it will be apparent to those skilled in the art that the electronic device according to the present disclosure is not limited to the aforementioned devices.

Hereinafter, an electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

FIG. 1 illustrates a network environment including an electronic device according to various embodiments of the present disclosure.

Referring to FIG. 1, a network environment 100 may include an electronic device 101. The electronic device 101 may include a bus 110, a processor 120, a memory 130, an input/output interface 140, a display 150, a communication interface 160, and a function execution control module 170.

The bus 110 may be a circuit interconnecting the aforementioned components and transmitting communication (e.g., a control message) between the aforementioned components.

The processor 120, for example, may receive instructions from the aforementioned components (e.g., the memory 130, the input/output interface 140, the display 150, the communication interface 160, and the function execution control module 170) other than the processor 120 through the bus 110, decode the received instructions, and perform operations or data processing according to the decoded instructions.

The memory 130 may store instructions or data received from or generated by the processor 120 or other components (e.g., the input/output interface 140, the display 150, the communication interface 160, and the function execution control module 170). The memory 130 may include programming modules, for example, a kernel 131, middleware 132, an application programming interface (API) 133, and applications 134. Each of the programming modules as described above may be formed by software, firmware, hardware, or a combination of two or more thereof.

The kernel 131 may control or manage system resources (e.g., the bus 110, the processor 120, and the memory 130) used to execute operations or functions implemented in the remaining other programming modules, for example, the middleware 132, the API 133, and the applications 134. Further, the kernel 131 may provide an interface that allows the middleware 132, the API 133, or the applications 134 to access and control or manage individual components of the electronic device 101.

The middleware 132 may serve to mediate between the API 133 or the applications 134 and the kernel 131, (i.e., allow the API 133 or the application 134 to communicate and exchange data with the kernel 131). Further, the middleware 132 may control (e.g., scheduling or load balancing) task requests received from the applications 134 by using, for example, a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and may include at least one interface or function (e.g., instruction) for, for example, file control, window control, image processing, or text control.

According to various embodiments of the present disclosure, the applications 134 may include a short message service (SMS)/multimedia messaging service (MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., the electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101

(e.g., the SMS/MMS application, the e-mail application, the health care application, or the environmental information application), to an external electronic device (e.g., the electronic device 104). Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device (e.g., the electronic device 104) communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments of the present disclosure, the applications 134 may include an application specified according to the attribute (e.g., type) of an external electronic device (e.g., the electronic device 104). For example, when the external electronic device is an MP3 player, the applications 134 may include an application associated with music playback. Similarly, when the external electronic device is a mobile medical device, the applications 134 may include an application associated with health care. The applications 134 may include at least one of an application assigned to the electronic device 101 and an application received from an external electronic device (e.g., the server 106 or the electronic device 104).

The input/output interface 140 may transmit a command or data input from a user through an input/output device (for example, a sensor, a keyboard, or a touch screen) to the processor 120, the memory 130, the communication interface 160, or the function execution control module 170 through, for example, the bus 110. For example, the input/output interface 140 may provide, to the processor 120, data for a user's touch which is input through the touch screen. Further, the input/output interface 140 may output, for example, commands or data, which are received from the processor 120, the memory 130, the communication interface 160, or the function execution control module 170 through the bus 110, through the input/output device (for example, a speaker or a display). For example, the input/output interface 140 may output voice data processed through the processor 120 to a user through a speaker.

The display 150 may display various information (e.g., multimedia data or text data) to a user. The display 150 may include a touch screen. The touch screen may detect a direct touch by a hand of a user or a touch pen, and hovering.

The communication interface 160 may establish communication between the electronic device 101 and an external electronic device (e.g., the electronic device 104 or the server 106). For example, the communication interface 160 may be connected to the network 162 through wireless or wired communication and thereby communicate with the external device. The wireless communication, for example, may include at least one of Wi-Fi, bluetooth (BT), near field communication (NFC), a GPS, and cellular communication (e.g., long term evolution (LTE), LTE-advanced (LTE-A), code division multiple access (CDMA), wideband CDMA (WCDMA), universal mobile telephone system (UMTS), wireless broadband (WiBro), or global system for mobile communications (GSM)). The wired communication, for example, may include at least one of a universal serial bus (USB), a high definition multimedia interface (HDMI), recommended standard 232 (RS-232), and a plain old telephone service (POTS).

According to an embodiment of the present disclosure, the network 162 may be a telecommunications network. The telecommunications network may include at least one of a computer network, the Internet, the Internet of things, and a telephone network. A protocol (e.g., a transport layer protocol, a data link layer protocol, or a physical layer protocol) for communication between the electronic device 101 and an external device may be supported by at least one of the applications 134, the API 133, the middleware 132, the kernel 131, and the communication interface 160.

The function execution control module 170 may process at least a part of the information obtained from other components (e.g., the processor 120, the memory 130, the input/output interface 140, or the communication interface 160) and provide the processed information to a user in various ways. The function execution control module 170 may display a notification message through the display 150 in the middle of execution of a first function by using the processor 120 or while being independent from the processor 120, and receive a drag input for the notification message and divide a screen. The function execution control module 170 may display an existing executed first function and a second function executed in relation to the notification message on the divided screens, respectively. The notification message may include at least one of an image, text, or content.

For example, when the function execution control module 170 receives a notification message from the server 106 or other electronic apparatus 104, or by an operation of a user in the middle of execution of the first function, or the electronic apparatus 101 generates a notification message by an internal operation, the function execution control module 170 may display the corresponding notification message on the display 150. Further, when the function execution control module 170 detects a drag input for the notification message, the function execution control module 170 may divide the screen, and display a second function executed in relation to the notification message in a first region corresponding to a location, at which the drag input is released, in the divided regions. The drag input may be a direct touch for the touch screen or an input by hovering. The second function may include, for example, a user interface of an application related to at least one of an image, text, or content included in the notification message. The executed existing first function may be displayed in a second region, except for the first region, among the divided regions.

The function execution control module 170 may execute various functions by using the processor 120 or while being independent from the processor 120, and the execution of the function according to various embodiments of the present disclosure may include an output of an idle screen, fetch of data, execution of a user interface of an application, execution of a predetermined function of an application, and the like.

Figure 2:
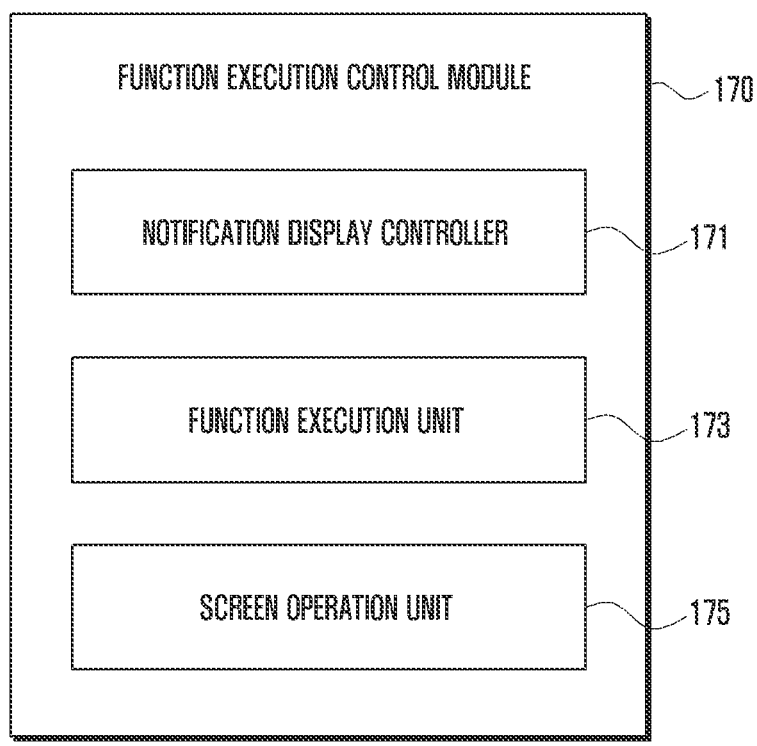
FIG. 2 is a block diagram illustrating an example of a function execution control module according to the embodiment of the present disclosure.

FIG. 2 is a block diagram illustrating an example of a function execution control module according to an embodiment of the present disclosure.

Referring to FIG. 2, the function execution control module 170 may include a notification display controller 171, a function execution unit 173, and a screen operation unit 175.

When the notification display controller 171 receives a notification message from the outside or internally generates a notification message, the notification display controller 171 may display the received or generated notification message on at least a part of a screen of the display 150. According to an embodiment of the present disclosure, when the notification display controller 171 receives a notification message from the server 106 or another electronic apparatus 104 through the network 162, the notification display controller 171 may display the received notification message on the screen. For example, the electronic apparatus 101 may receive a notification message for an update of an application stored in the electronic apparatus 101 or a notification message for data related to an application stored in the electronic apparatus 101 from the server 106. Further, the electronic apparatus 101 may receive data from another electronic apparatus 104 through the network 162, and the notification display controller 171 may generate a notification message for the received data.

According to an embodiment of the present disclosure, the notification display controller 171 may generate a notification message according to an operation of a user and display the generated notification message on the screen. For example, when data input by a user is data related to the execution of a specific function, the notification display controller 171 may display the corresponding data on the screen as a notification message. The notification message related to the execution of the specific function may include, for example, a universal resource locator (URL) address or a directory, and the notification message may display the notification message on the screen in a form of a link object. According to an embodiment, the notification display controller 171 may generate a notification message according to an internal setting of the electronic apparatus 101 and display the generated notification message on the screen. For example, the electronic apparatus 101 may update information according to the setting, and the notification display controller 171 may display the updated information on the screen as a notification message. The description of the display of the notification message is a simple embodiment of the disclosure, and it may be well appreciated that the present disclosure is not limited thereto.

The notification display controller 171 may display the notification message on at least a part of the screen of the display 150. According to an embodiment of the present disclosure, the notification display controller 171 may display the notification message on a notification window displayed in a form of a pop-up on the screen. The notification window may disappear after a predetermined time. The notification display controller 171 may display the notification message in a bar region at an upper end of the screen in a form of an icon. The bar region may further include icons displaying time information, network information, ring sound information, and the like. According to an embodiment, the notification display controller 171 may display the notification message on a state information providing screen output in response to a user's input. When a drag input from a topmost end to a lower end of the screen is detected, the state information providing screen may be output on the display 150. The state information providing screen may be output through the entire screen of the display 150. The state information providing screen may overlap the screen and be output in response to the drag input through the display 150 even though the first function is in the middle of execution. The state information providing screen may include various information about a state and a notification related to the electronic apparatus 101, as well as the notification message.

The function execution unit 173 may detect a user's input, for example, a drag input, for the notification message, and execute a second function corresponding to the notification message. The function execution unit 173 may execute a second function at a time point, at which the drag input is provided, or at a time point, at which the drag input is released. The second function may be a function set to be executed in relation to the notification message, and a function linked to the notification message. The function execution function 173 may detect a drag input for a notification message displayable by various methods as described above, and execute a second function corresponding to the notification message in response to the drag input. The function execution unit 173 may execute a second function together with a first function when the first function is being executed.

The screen operation unit 175 may divide the screen in response to the drag input. The screen operation unit 175 may divide the screen at a time point, at which the drag input is provided, or at a time point, at which the drag input is released. The screen operation unit 175 may divide the screen into two or more regions according to a setting. For example, the number of divided regions, locations of divided regions, sizes of divided regions, and the like may be preset. Otherwise, the screen operation unit 175 may divide the screen into two or more regions in response to a location at which the drag input is detected, for example, a drag movement direction or a location at which the drag is released. For example, when the drag input moves to an upper side or a lower side, or is released at a corresponding location, the screen may be vertically divided, and when the drag input moves to a left side or a right side, or is released at a corresponding location, the screen may be horizontally divided. The screen operation unit 175 may display a second function executed in relation to the notification message in a first region corresponding to a point, at which the drag input is released, among the divided regions. Further, the screen operation unit 175 may display the existing executed first function in a second region, except for the first region among the divided regions. For example, when a notification message is displayed during the execution of a first function and a user drags the notification message to an upper part of the screen, a second function, which is newly executed in relation to the notification message, may be displayed at a divided upper region and the existing executed first function may be displayed at a divided lower region.

Figure 3A:
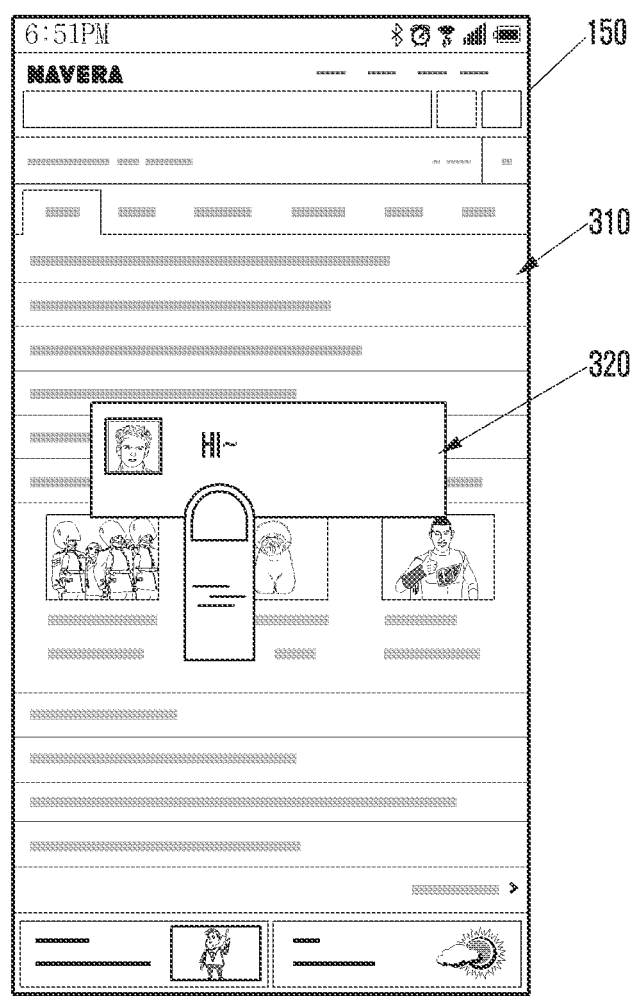
FIGS. 3A and 3B are screen example diagrams illustrating a screen display method of the electronic apparatus according to an embodiment of the present disclosure.
Figure 3B:
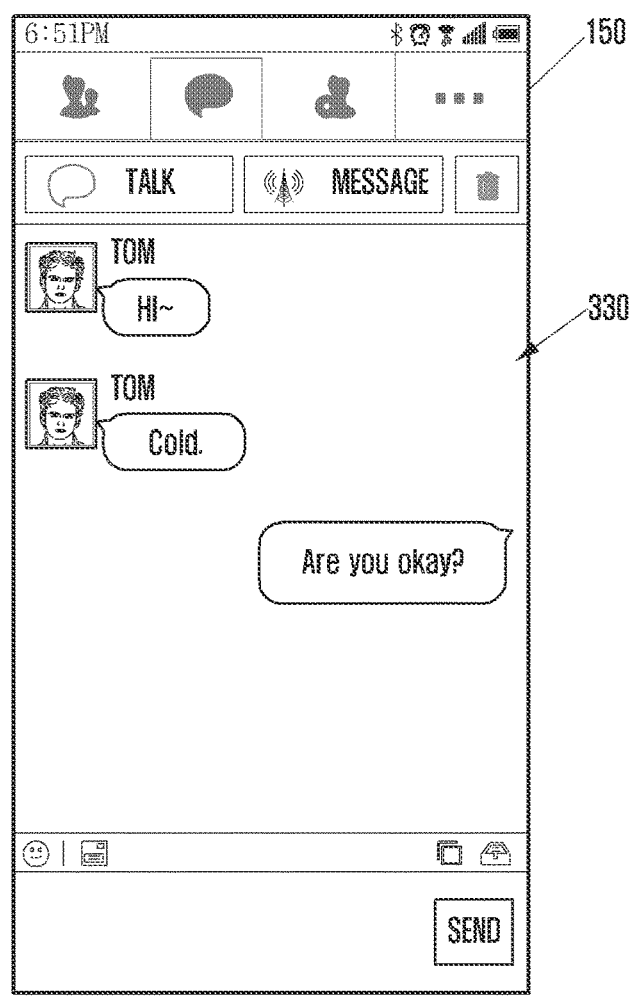

FIGS. 3A and 3B are screen example diagrams illustrating a screen display method of the electronic apparatus 101 according to an embodiment of the present disclosure.

Referring to FIG. 3A, the electronic apparatus 101 may execute a first function, for example, the Internet browser, and display the executed first function through a first screen 310 of the display 150. The first screen 310 may occupy the entire screen or at least a part of the display 150. When a notification message is received or generated during the display of the first function through the first screen 310, the electronic apparatus 101 may display the corresponding notification message on a display 150 through, for example, on a notification window 320. For example, when a message arrives through a social networking service (SNS) application as illustrated, the electronic apparatus 101 may display a notification message for the received message through the notification window 320. The notification window 320 may overlap the first screen 310 in a form of a pop-up. When the electronic apparatus 101 receives a selection input, for example, a touch input or a mouse click input, for the notification message or the notification window 320 including the notification message, the electronic apparatus 101 may execute a second function, for example, the SNS application, corresponding to the notification message. Further, referring to FIG. 3B, the first screen 310 may be switched to a second screen 330 displaying the second function.

FIGS. 4A to 4F are screen example diagrams illustrating a screen display method of an electronic apparatus according to an embodiment of the present disclosure.

Figure 4A:
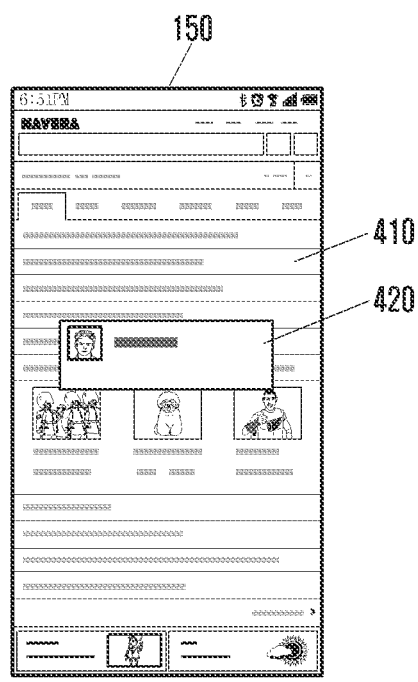
FIGS. 4A, 4B, 4C, 4D, 4E, and 4F are screen example diagrams illustrating a screen display method of the electronic apparatus according to an embodiment of the present disclosure.
Figure 4B:
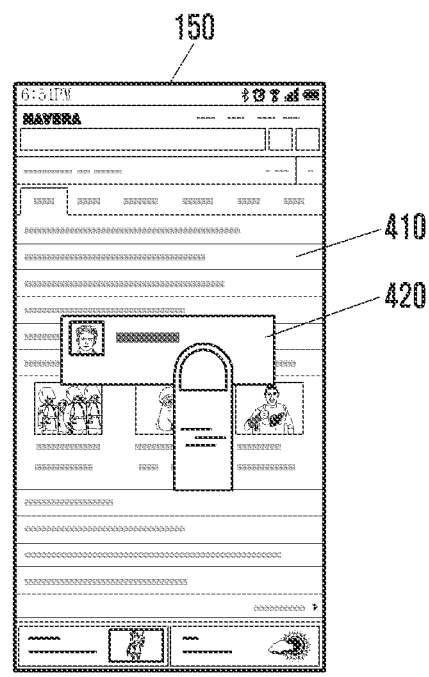

Referring to FIGS. 4A and 4B, the electronic apparatus 101 may execute a first function, for example, the Internet browser, and display the executed first function through a first screen 410 of the display 150. The first screen 410 may occupy the entire screen or at least a part of the display 150. When a notification message is received or generated during the display of the first function through the first screen 410, the electronic apparatus 101 may display the corresponding notification message on a display 150 through, for example, on a notification window 420. For example, when a message arrives through an SNS application as illustrated, the electronic apparatus 101 may display a notification message for the received message through the notification window 420. The notification window 420 may overlap the first screen 410 in a form of a pop-up.

Figure 4C:
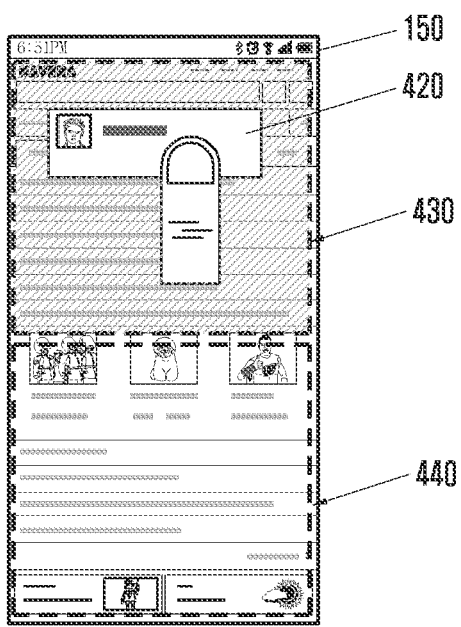
Figure 4D:
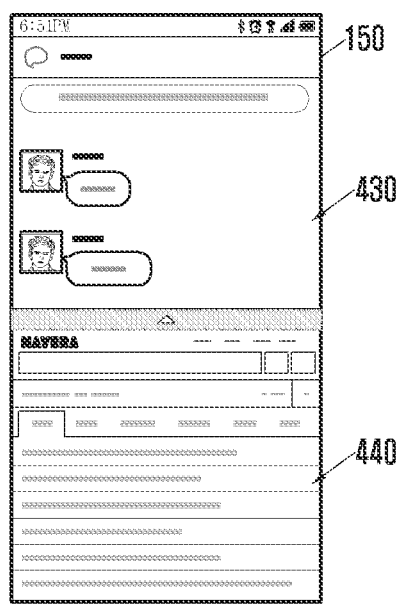
Figure 4E:
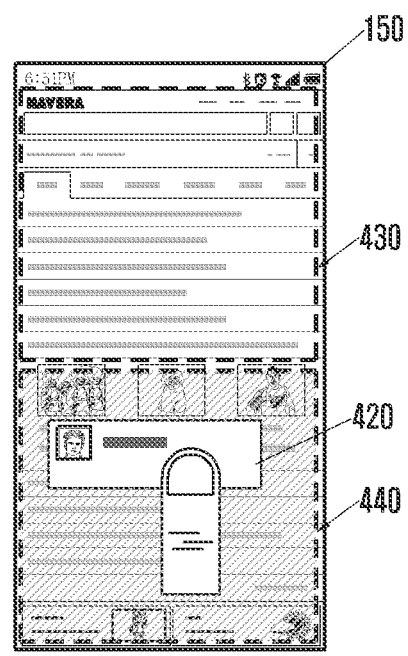

Referring to FIGS. 4C to 4F, a user may provide a drag input for the notification message or the notification window 420 including the notification message. The user may provide the drag input toward, for example, the upper side or the lower side of the screen as illustrated in FIG. 4C or 4D. For example, the screen of the display may include a first side that is an upper corner of the screen, a second side that is substantially vertical to the first side, a third side that is substantially vertical to the second side and is substantially parallel to the first side, and a fourth side that is substantially vertical to the third and is substantially parallel to the second side. When the notification window 420 substantially located at a center part is dragged to the upper part of the screen, (i.e., a space between the first location and the first side) a second function corresponding to the notification message may be displayed in a first region 430 (i.e., a region surrounded by the first side, a half of the second side close to the first side, and a half of the fourth side close to the first side).

According to an embodiment, a movement of the notification window 420 in response to the drag input may be displayed on the display 150. The electronic apparatus 101 may divide the screen, for example, the first screen 410, into the first region 430 and a second region 440 according to a setting. The electronic apparatus 101 may provide a guide for the screen division during the providing of the drag input, and provide a division indication by a method of displaying a shadow for a region corresponding to a location, to which the drag input is provided, among the divided regions, and the like. The electronic apparatus 101 may execute the second function, for example, the SNS application, in relation to the notification message based on a time point, at which the drag input is provided, or a time point, at which the drag input is released.

Figure 4F:
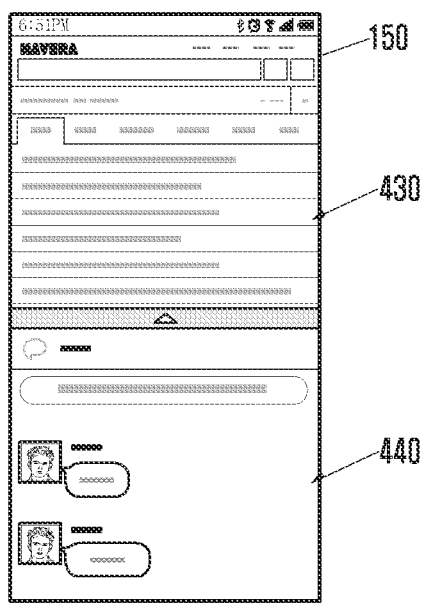

The electronic apparatus 101 may display the second function in a region corresponding to a point, at which the drag input is released, among the divided regions, and display the first function in the remaining region. For example, when the drag input is released in the first region 430, the second function is displayed in the first region 430 and the first function is displayed in the remaining second region 440 as illustrated in FIG. 4D. In contrast, when the drag input is released in the second region 440, the second function may be displayed in the second region 440 and the first function may be displayed in the remaining first region 430 as illustrated in FIG. 4F.

FIGS. 5A to 5D are screen example diagrams illustrating a screen display method of the electronic apparatus 101 according to an embodiment of the present disclosure.

Figure 5A:
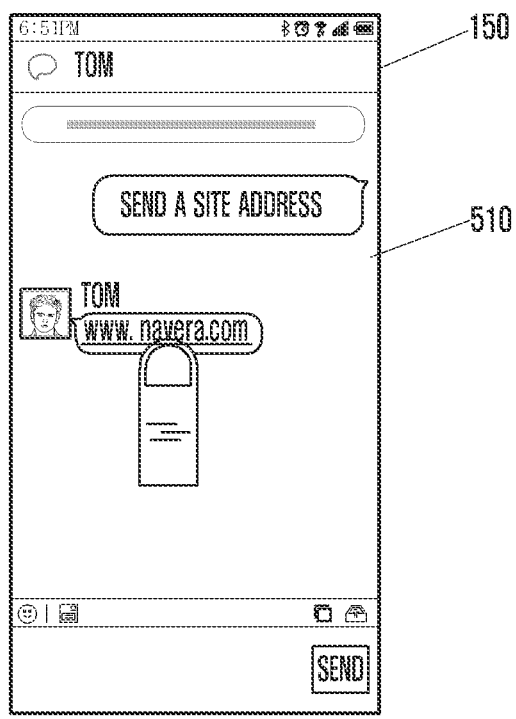
FIGS. 5A, 5B, 5C, and 5D are screen example diagrams illustrating a screen display method of the electronic apparatus according to an embodiment of the present disclosure.

Referring to FIG. 5A, the electronic apparatus 101 may execute a first function, for example, an SNS application, and display the executed first function through a first screen 510 of the display 150. The first screen 510 may occupy the entire screen or at least a part of the display 150. The electronic apparatus 101 may receive a notification message during the execution of the SNS application, and display the received notification message on the first screen 510. For example, the notification message may be an URL address input by a counterpart person during the execution of the SNS application as illustrated in FIG. 5A.

Figure 5B:
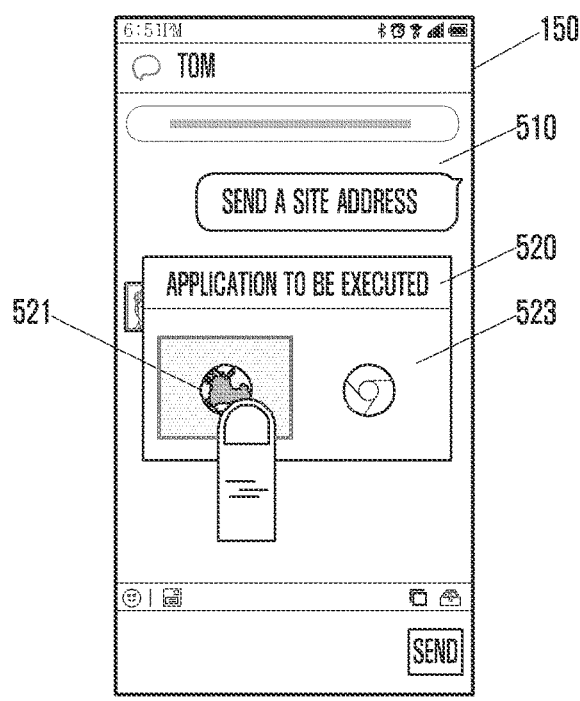

When a selection input, for example, a touch input, a touch long-press input, or a mouse click input is provided for the notification message, for example, the URL address, the electronic apparatus 101 may provide a notification window 520 including an application list 521 and 523 required for executing the notification message on the screen as illustrated in FIG. 5B. In the embodiment of the present disclosure, an Explorer browser 521 or a Chrome browser 523 may be included in the application list. The notification window 520 may be provided in a form of a pop-up. A user may provide a drag input for any one item, for example, the Explorer browser 521, in the application list. Even though the drag input is provided for the item of the Explorer browser 521, the electronic apparatus 101 may display the notification window 520 to move in response to the drag input.

Figure 5C:
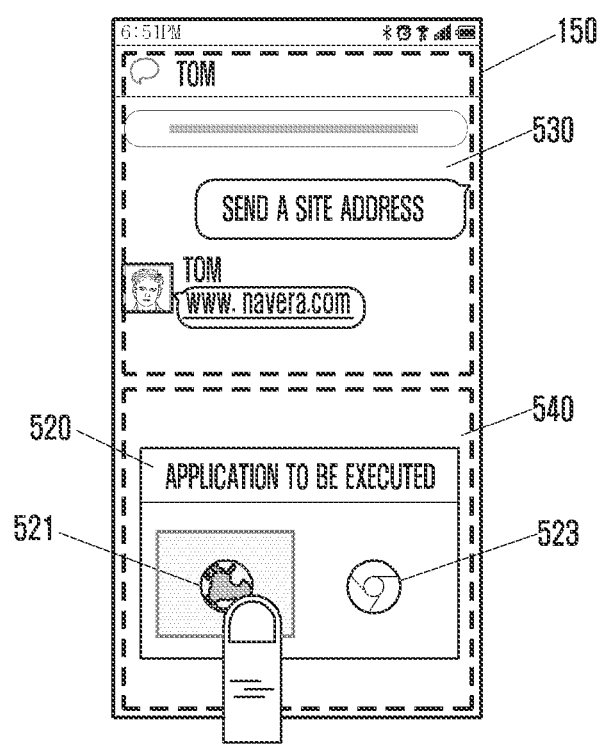
Figure 5D:
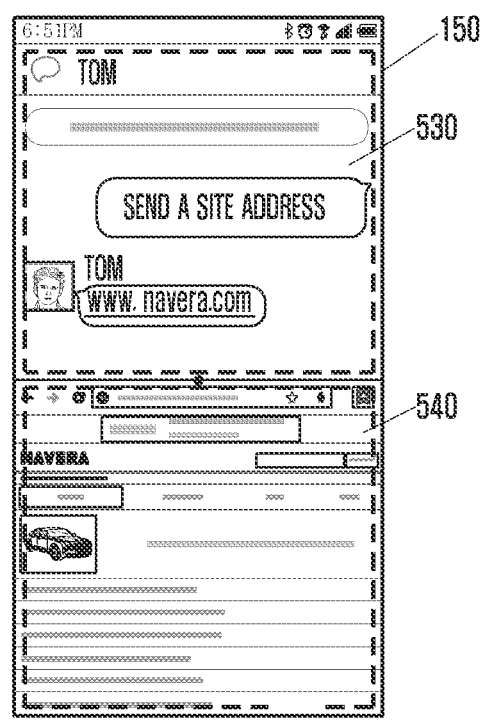

Referring to FIGS. 5C and 5D, the electronic apparatus 101 may detect the drag input and execute a second function, for example, an Internet page corresponding to the URL address, based on the selected Explorer browser, and display the executed second function in a region corresponding to a point at which the drag input is released. For example, when the drag input is released in the second region 540 between the first and second regions 530 and 540, the second function may be displayed in the second region 540 and the first function may be displayed in the remaining first region 530.

Although not illustrated in FIGS. 5A to 5D, when a drag input for the URL address that is the notification message is provided according to an embodiment, the screen may be divided, an Internet page corresponding to the URL address may be displayed in a divided region, in which the drag input is released, and the existing executed SNS application may be displayed in the remaining region.

FIGS. 6A to 6D are screen example diagrams illustrating a screen display method of the electronic apparatus 101 according to an embodiment of the present disclosure.

Figure 6A:
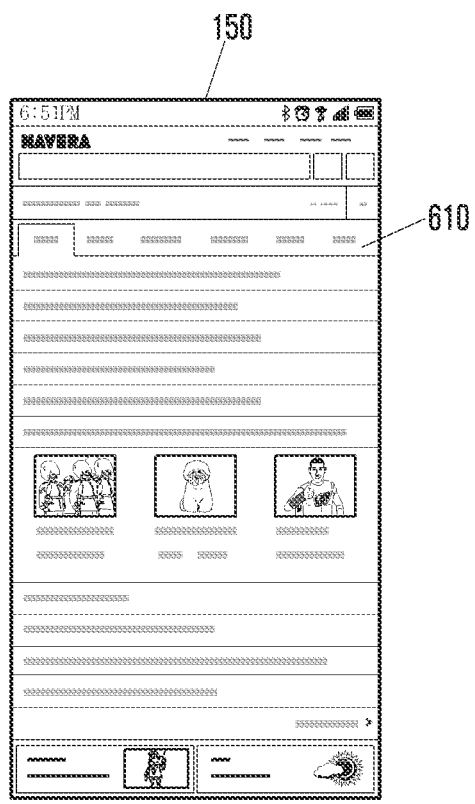
FIGS. 6A, 6B, 6C, and 6D are screen example diagrams illustrating a screen display method of the electronic apparatus according to the embodiment of the present disclosure.
Figure 6B:
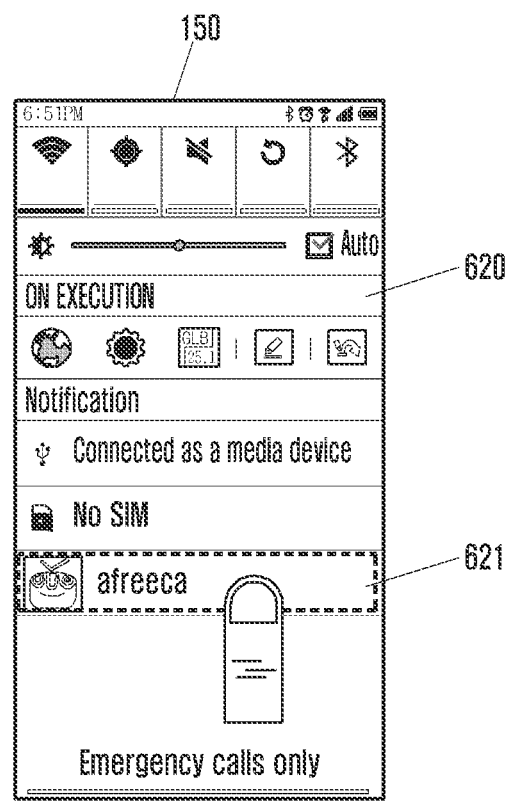

Referring to FIGS. 6A and 6B, the electronic apparatus 101 may execute a first function, for example, the Internet browser, and display the executed first function through a first screen 610 of the display 150. The first screen 610 may occupy the entire screen or at least a part of the display 150. When the electronic apparatus 101 receives a notification message or generates a notification message during the display of the first function through the first screen 610, the electronic apparatus 101 may set the corresponding notification message not to be displayed in a form of a pop-up. Otherwise, when a user desires to check a displayed notification message later, the electronic apparatus 101 may terminate the notification message displayed in a form of a pop-up. When a user desires to check the notification message during the execution of the first function, the electronic apparatus 101 may receive a separate user input and output a state information providing screen 620. The state information providing screen 620 may be output, for example, when a drag input from a topmost end to a lower end of the screen is detected. The state information providing screen 620 may overlap the first screen 610 to be output. The state information providing screen 620 may include various information about a state and a notification related to the electronic apparatus 101, and includes a notification message 621.

Figure 6C:
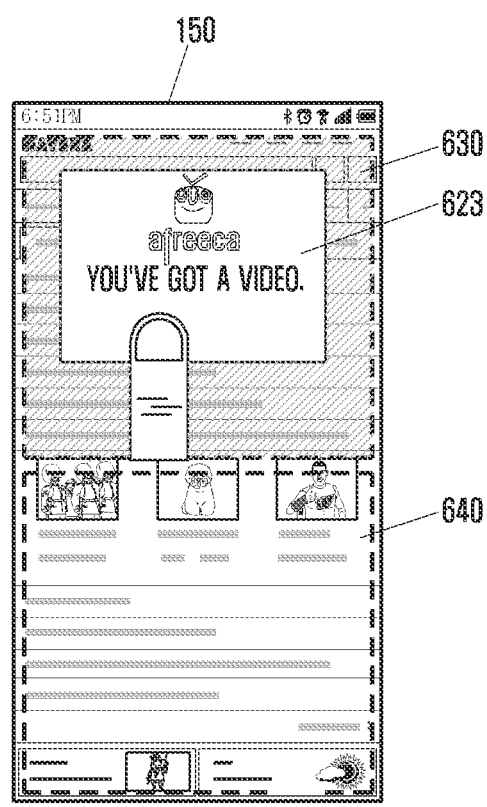
Figure 6D:
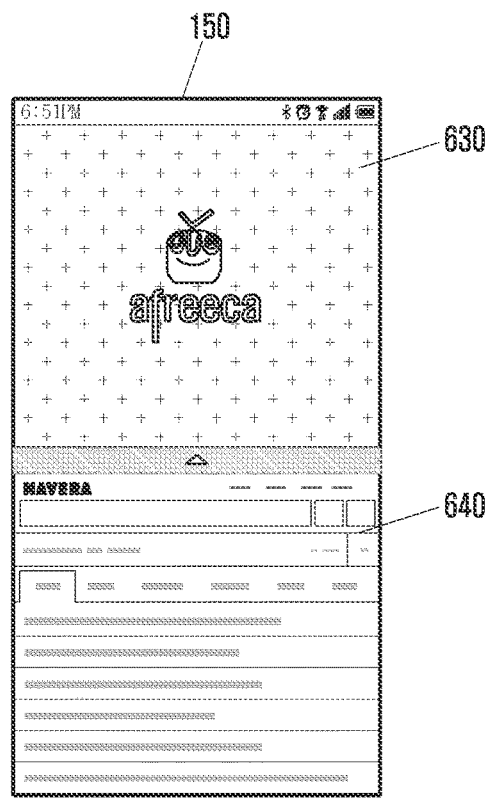

The user may provide a drag input for the notification message 621. When the drag input for the notification message 621 is detected, the electronic apparatus 101 may switch the state information providing screen 620 to the existing first screen 610, and generate a notification window 623 including the notification message and move the notification window 623 in response to the drag input as illustrated in FIG. 6C. The electronic apparatus 101 may provide a guide for the screen division through the display 150 during the providing of the drag input. The electronic apparatus 101 may execute a second function, for example, a video play application, in relation to the notification message based on a time point, at which the drag input is provided, or a time point, at which the drag input is released. The electronic apparatus 101 may display the second function in a region corresponding to a point, at which the drag input is released, among the divided regions, and display the first function in the remaining region. For example, when the drag input is released in a divided first region 630, the second function is displayed in the first region 630 and the first function is displayed in a remaining second region 640 as illustrated in FIG. 6D.

FIGS. 7A to 8C are screen example diagrams illustrating a screen display method of an electronic apparatus according to various embodiments of the present disclosure. The present various embodiments relate to a case where the electronic apparatus receives data from another electronic device 104 connected through a short range network, for example, Wi-Fi, BT, or NFC.

Figure 7A:
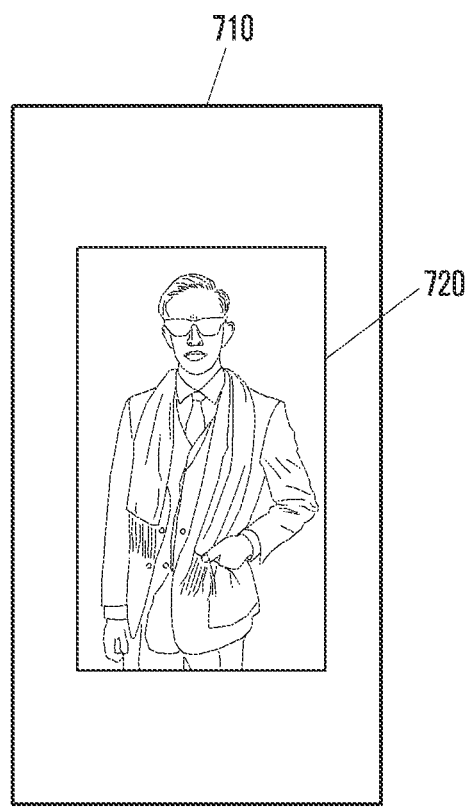
FIGS. 7A, 7B, and 7C are screens example diagrams illustrating a screen display method of the electronic apparatus according to the embodiment of the present disclosure.

Referring to FIG. 7A, another electronic apparatus 104 may transmit image data 720 output on a display 710 to the electronic apparatus 101 through NFC.

Figure 7B:
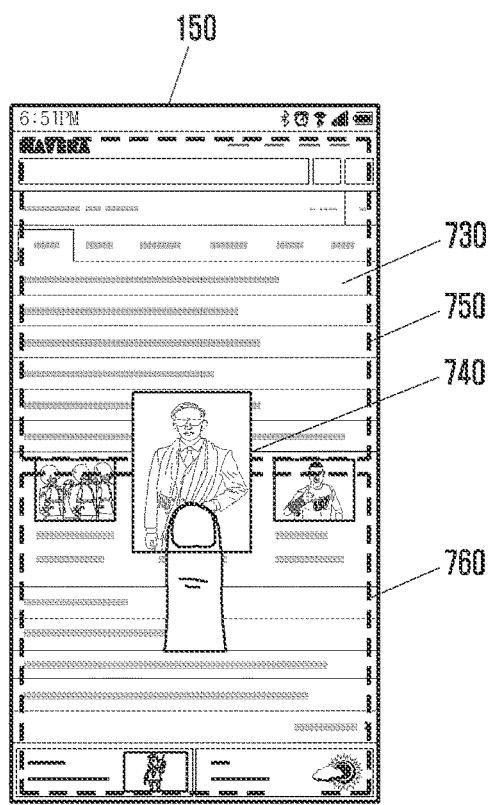
Figure 7C:
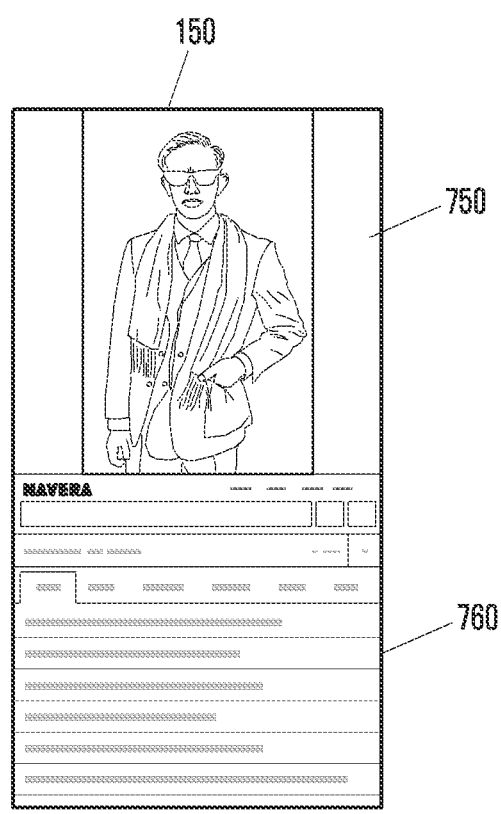

Referring to FIG. 7B, the electronic apparatus 101 may be executing a first function, and displaying the executed first function on a first screen 730 of the display 150. The first screen 730 may occupy the entire screen or at least a part of the display 150. When the electronic apparatus 101 receives the image data from another electronic apparatus 104, the electronic apparatus 101 may display the image data in a form of a thumb-nail image 740. The thumb-nail image 740 may overlap the first screen 730 in a form of a pop-up.

According to an embodiment of the present disclosure, a user may provide a selection input for the thumb-nail image 740. The electronic apparatus 101 may display the received image data on the entire screen in response to the selection input for the thumb-nail image 740.

According to an embodiment of the present disclosure, the user may provide a drag input for the thumb-nail image 740. The user may provide the drag input toward, for example, an upper part or a lower part of the screen. A movement of the thumb-nail image 740 may be displayed on the display 150 in response to the drag input. The electronic apparatus 101 may divide the first screen 730 into, for example, a first region 750 and a second region 760. The electronic apparatus 101 may provide a guide for a screen division during the providing of the drag input. The electronic apparatus 101 may display the image data in a region corresponding to a point, at which the drag input is released, among the divided regions, and display the first function in the remaining region. For example, referring to FIG. 7C, when the drag input is released in the first region 750, the image data may be displayed in the first region 750 and the first function may be displayed in the second region 760. By contrast, when the drag input is released in the second region 760, the image data may be displayed in the second region 760 and the first function may be displayed in the first region 750.

Figure 8A:
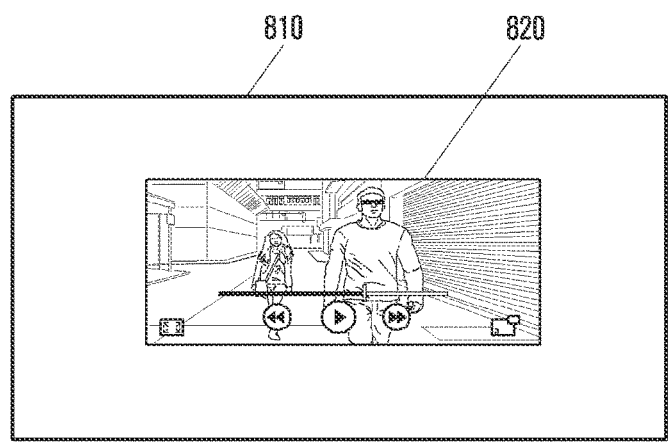
FIGS. 8A, 8B, and 8C are screen example diagrams illustrating a screen display method of the electronic apparatus according to the embodiment of the present disclosure.

Referring to FIG. 8A, another electronic apparatus 104 may transmit video data 820 output on a screen 810 to the electronic apparatus 101 through NFC.

Figure 8B:
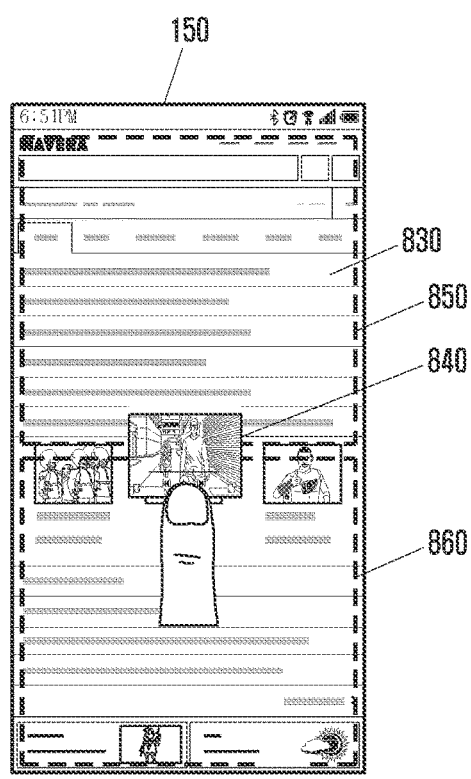
Figure 8C:
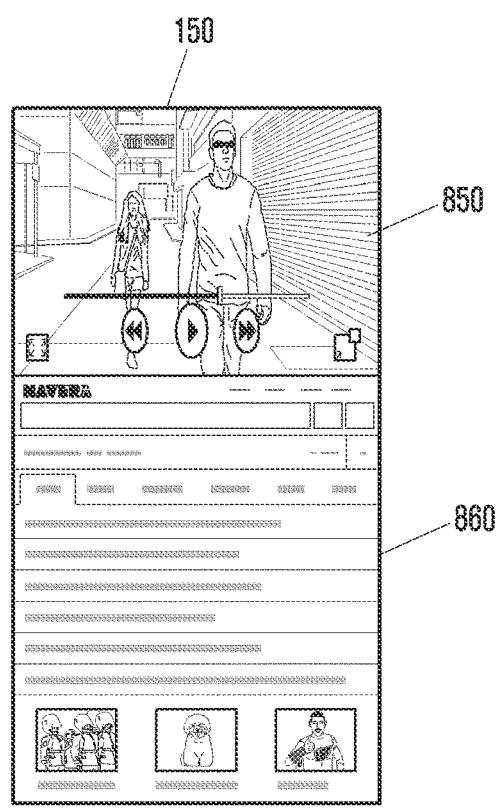

Referring to FIG. 8B, the electronic apparatus 101 may be executing a first function, and displaying the executed first function on a first screen 830 of the display 150. The first screen 830 may occupy the entire screen or at least a part of the display 150. When the electronic apparatus 101 receives the video data from another electronic apparatus 104, the electronic apparatus 101 may display, for example, a stopped image of the video data in a form of a thumb-nail image 840. The thumb-nail image 840 may overlap the first screen 830 in a form of a pop-up.

According to an embodiment of the present disclosure, a user may provide a selection input for the thumb-nail image 840. The electronic apparatus 101 may display the received video data on the entire screen in response to the selection input for the thumb-nail image 840. The electronic apparatus 101 may reproduce a video from a stopped image while displaying the received video data on the entire screen.

According to an embodiment of the present disclosure, the user may provide a drag input for the thumb-nail image 840. The user may provide the drag input toward, for example, an upper part or a lower part of the screen. A movement of the thumb-nail image 840 may be displayed on the display 150 in response to the drag input. The electronic apparatus 101 may divide the first screen 830 into, for example, a first region 850 and a second region 860. The electronic apparatus 101 may provide a guide for a screen division during the providing of the drag input. The electronic apparatus 101 may display the video data in a region corresponding to a point, at which the drag input is released, among the divided regions, and display the first function in the remaining region. For example, referring to FIG. 8C, when the drag input is released in the first region 850, the video data may be displayed in the first region 850 and the first function may be displayed in the second region 860. By contrast, when the drag input is released in the second region 860, the video data may be displayed in the second region 860 and the first function may be displayed in the first region 850. When the video data is displayed in the divided region, the video may be automatically reproduced, for example, from the stopped image.

Figure 9:
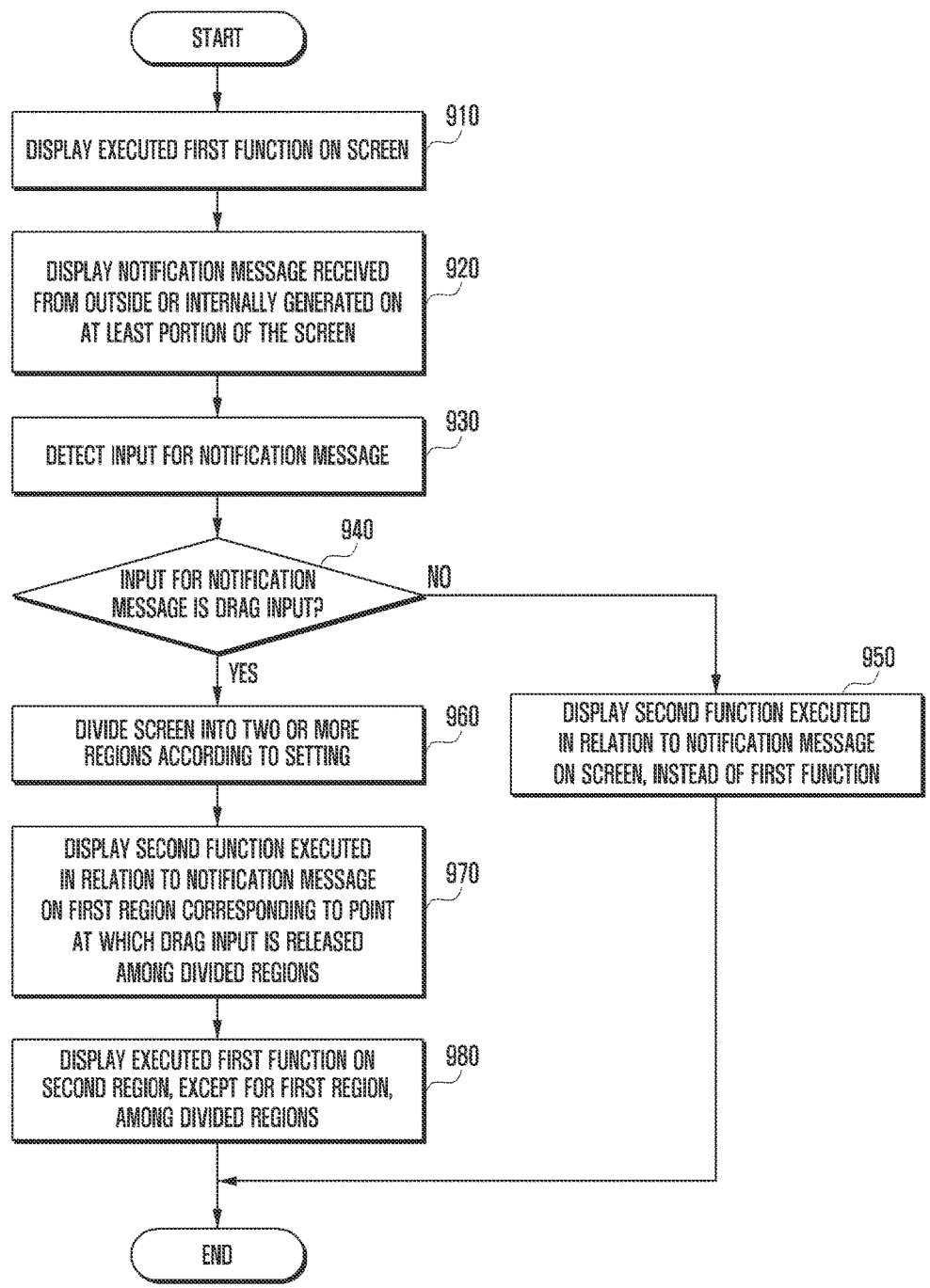
FIG. 9 is a flowchart illustrating a screen display method of the electronic apparatus according to an embodiment of the present disclosure.

FIG. 9 illustrates a flowchart illustrating a screen display method of an electronic apparatus according to an embodiment of the present disclosure.

Referring to FIG. 9, the electronic apparatus 101 may execute a first function in operation 910, and display the executed first function through the screen of the display. The first function may include data, an application, a predetermined function of an application, and the like output by a manipulation of a user.

When the electronic apparatus 101 receives a notification message from the outside or internally generates a notification message during the display of the first function, the electronic apparatus 101 may display the notification message on at least a part of the screen in operation 920. The notification message may be displayed as a part of the screen on which the first function is output, through a notification window in a form of a pop-up, or on a state information providing screen output by a separate input of the user.

The electronic apparatus 101 may receive an input for the notification message in operation 930, and check whether the input is a simple selection input or a drag input in operation 940. When the input is a simple selection input, such as a touch input and a mouse click input, for the notification message, the electronic apparatus 101 may switch the output screen from a first function execution screen to a second function execution screen executed in relation to the notification message in operation 950.

When the input is a drag input for the notification message, the electronic apparatus 101 may divide the screen into two or more regions according to a setting in operation 960. For example, the electronic apparatus 101 may also divide the screen according to a pre-stored setting, and by detecting a location of the drag input.

The electronic apparatus 101 may display a second function executed in relation to the notification message in a first region corresponding to a point, at which the drag input is released, among the divided regions, in operation 970. Further, the electronic apparatus 101 may display the existing executed first function in a second region, except for the first region, among the divided regions in operation 980. Accordingly, according to an embodiment of the present disclosure, the electronic apparatus 101 may simultaneously output the existing executed first function and the newly executed second function through one screen.

Figure 10A:
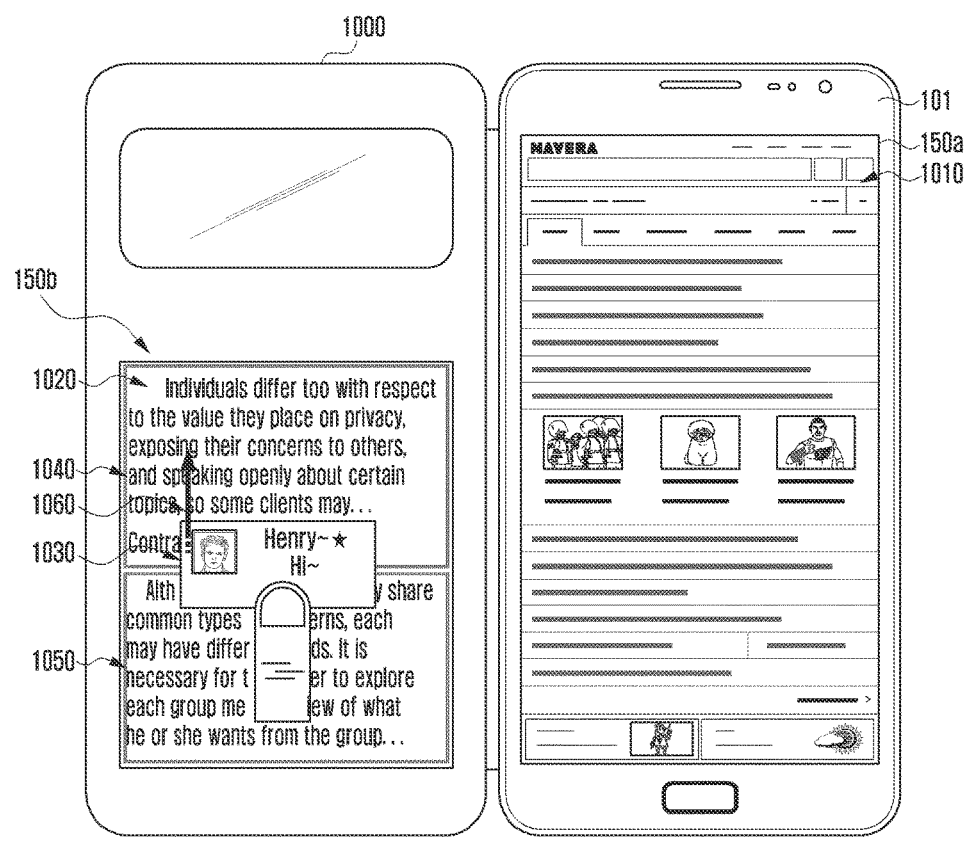
FIGS. 10A and 10B are screen example diagrams illustrating a screen display method of the electronic apparatus according to an embodiment of the present disclosure.
Figure 10B:
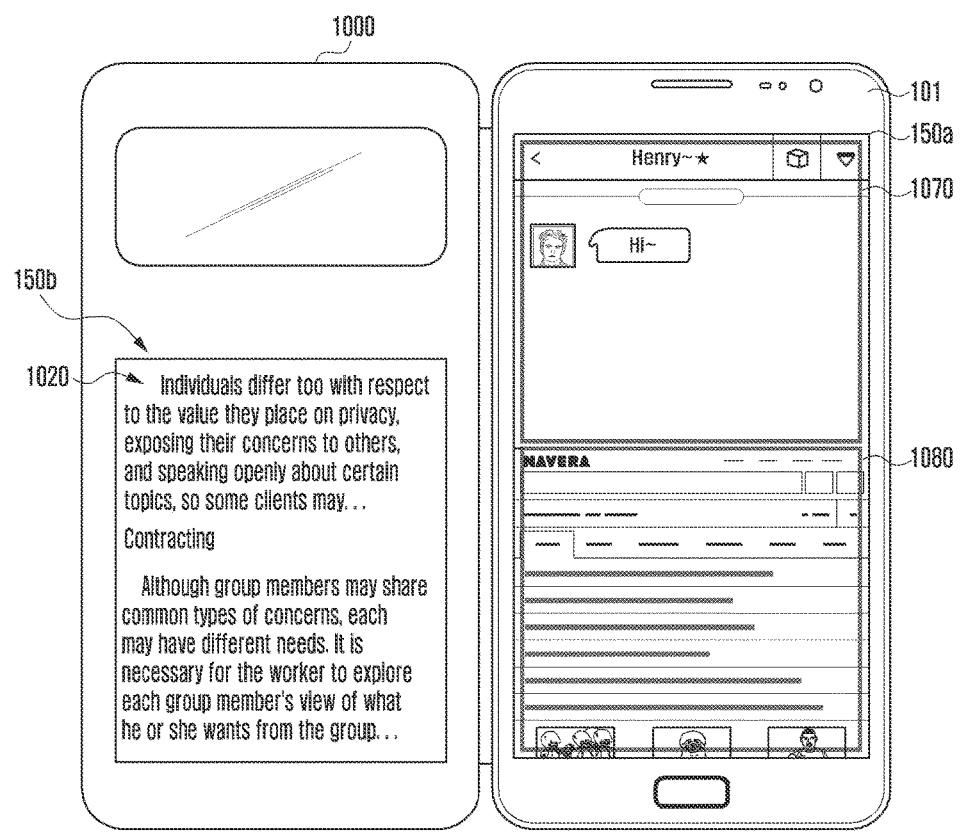

FIGS. 10A and 10B are screen example diagrams illustrating a screen display method of an electronic apparatus including one or more displays according to various embodiments of the present disclosure.

Referring to FIGS. 10A and 10B, the electronic apparatus 101 may include, for example, a first display 150a and a second display 150b. The first display 150a may be operated as a main screen and the second display 150b may be operated as an auxiliary screen. For example, referring to FIGS. 10A and 10B, a main body of the electronic apparatus 101 including the first display 150a may be formed on one surface of a cover 1000, and the second display 150b may be formed on the other surface of the cover 1000. The electronic apparatus 101 may execute a first function and a second function, and may display a first function execution screen 1010 on the first display 150a, and a second function execution screen 1020 on the second display 150b.

When the electronic apparatus 101 receives a notification message transmitted by an external device, such as a server, or a notification message is generated inside the electronic apparatus 101, the electronic apparatus 101 may display the notification message 1030 on a partial region of the second display 150b. The notification message 1030 may overlap the second function execution screen 1020 in a form of a pop-up.

According to an embodiment of the present disclosure, a user may provide a selection input for the notification message 1030. Although not illustrated in FIGS. 10A and 10B, the electronic apparatus 101 displays a screen, in which a third function corresponding to the notification message 1030 is executed, on the first and/or second display 150a and/or 150b in response to the selection input for the notification message 1030.

According to an embodiment, the user may provide a drag input 1060 for the notification message 1030. For example, when it is set that the electronic apparatus 101 may vertically divide the screen, the user may provide the drag input 1060 toward an upper part or a lower part of the screen. A movement of the notification message 1030 may be displayed on the second display 150b in response to the drag input 1060. The electronic apparatus 101 may provide a guide dividing the second display 150b into a first region 1040 and a second region 1050 during the providing of the drag input 1060.

When the drag input 1060 is released, the electronic apparatus 101 may divide the first display 150a into a first region 1070 and a second region 1080. For example, when the drag input 1060 is released in the first region 1040 of the second display 150b, the electronic apparatus 101 may display an execution screen of the third function corresponding to the notification message 1030 on the first region 1070 corresponding to a point at which the drag input 1060 is released, among the divided regions of the first display 150a. Further, the electronic apparatus 101 may display an execution screen of the first function on the remaining second region 1080 of the first display 150a, and display an execution screen of the second function on the second display 150b.

Figure 11:
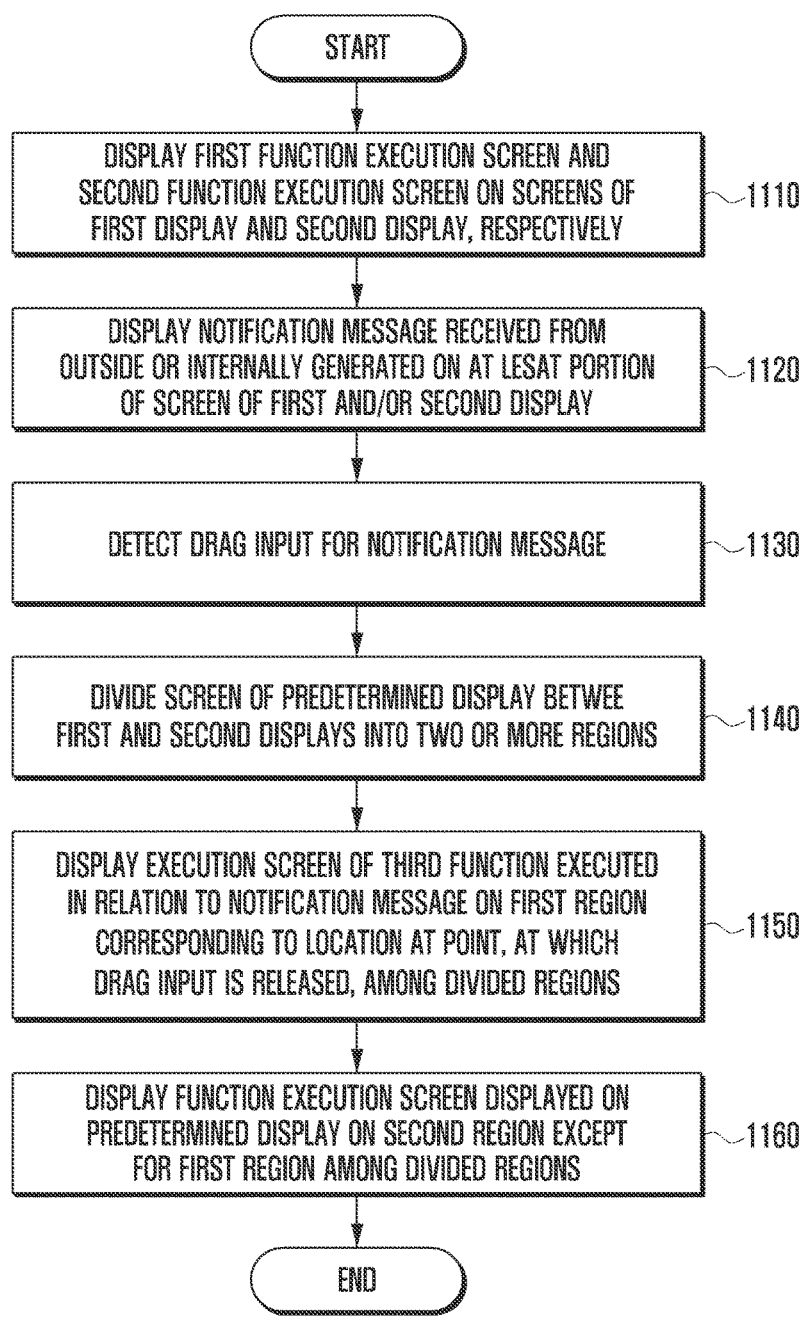
FIG. 11 is a flowchart illustrating a screen display method of the electronic apparatus according to an embodiment of the present disclosure.

FIG. 11 illustrates a flowchart illustrating a screen display method of an electronic apparatus including one or more displays according to an embodiment of the present disclosure.

Referring to FIG. 11, the electronic apparatus 101 may execute a plurality of functions, and display an execution screen of each function through each display in operation 1110. For example, when the electronic apparatus 101 includes first and second displays, the electronic apparatus 101 may display a first function execution screen through the first display and a second function execution screen through the second display.

The electronic apparatus 101 may receive a notification message from an external device, for example, a server or another electronic apparatus, or internally generate a notification message in operation 1120. The notification message may include at least one of, for example, an image, text, or content. The electronic apparatus 101 may display the notification message on at least a part of a screen of the first and/or second display.

The electronic apparatus 101 may detect a drag input for the notification message in operation 1130. The drag input may be an input by a direct touch or an input by hovering for the notification message. The electronic apparatus 101 may display the notification message on at least a part of the screen of the first and/or second display, and a user may provide a drag input through the screen of the first and/or second display.

When the drag input is released, the electronic apparatus 101 may divide a screen of a predetermined display between the screens of the first and second displays into two or more regions in operation 1140. For example, the electronic apparatus 101 may receive the drag input through the second display, and when the drag input is released, the electronic apparatus 101 may divide the screen of the first display into two or more regions. When the electronic apparatus 101 is set to vertically divide the screen, the electronic apparatus 101 may vertically divide the screen of the first display according to the release of the drag input.

The electronic apparatus 101 may display an execution screen of a third function executed in relation to the notification message in a first region corresponding to a location, at which the drag input is released, among the divided regions in operation 1150. The third function may include a user interface of an application related to one or more among the image, the text, or the content included in the notification message. According to various embodiments of the present disclosure, when the drag input is released in an upper region of the second display, the electronic apparatus 101 may display a third function execution screen on an upper region among the divided regions of the first display. In contrast, when the drag input is released in a lower region of the second display, the electronic apparatus 101 may display the third function execution screen on a lower region among the divided regions of the first display.

The electronic apparatus 101 may display a function execution screen, which has been displayed on a predetermined display, on a second region, except for the first region, among the divided regions in operation 1160. According to various embodiments of the present disclosure, when the third function execution screen is displayed on the upper region among the divided regions of the first display, the electronic apparatus 101 may display the first function execution screen, which has been executed on the first display, on a lower region among the divided regions. In contrast, when the third function execution screen is displayed on the lower region among the divided regions of the first display, the electronic apparatus 101 may display the first function execution screen, which has been executed on the first display, on the upper region among the divided regions.

FIGS. 12A and 12B are screen example diagrams illustrating a screen display method of an electronic apparatus by using another electronic apparatus according to various embodiments of the present disclosure.

Referring to FIGS. 12A and 12B, the electronic apparatus 101 may execute a function related to a notification message by using another electronic apparatus 104 connected with the electronic apparatus 101 through a network, and output an execution screen of the corresponding function on a predetermined region of the divided screen. The electronic apparatus 101 and another electronic apparatus 104 may be connected, for example, by wireless or wired communication. According to an embodiment of the present disclosure, the electronic apparatus 101 may be a smart phone, and the other electronic apparatus 104 may be a wearable smart watch. The same function may be interworked between the electronic apparatus 101 and the other electronic apparatus 104 through a network connection.

The electronic apparatus 101 may execute a first function, and display a first function execution screen 1210 through the display 150. The other electronic apparatus 104 may execute a second function, and display a second function execution screen 1220 through a display 1200.

The other electronic apparatus 104 may display a notification message received, by the electronic apparatus 101 and/or another electronic apparatus 104, from the outside and/or a notification message 1230 internally generated by another electronic apparatus 104 on a partial region of the display 1200. The other electronic apparatus 104 may receive the notification message received by the electronic apparatus 101 from the outside and/or the internally generated notification message through the network and display the received notification message.

According to an embodiment of the present disclosure, a user may provide a selection input for the notification message 1230. Although not illustrated in FIGS. 12A and 12B, the electronic apparatus 101 and/or the other electronic device 104 may display a screen, in which a third function corresponding to the notification message 1230 is executed, on the displays 150 and 1200 in response to the selection input for the notification message 1230.

According to an embodiment of the present disclosure, a user may provide a drag input 1260 for the notification message 1230. For example, when the electronic apparatus 101 is set to vertically divide the screen, the user may provide the drag input 1260 toward an upper part or a lower part of the screen. A movement of the notification message 1230 may be displayed on the display 1200 of the other electronic apparatus 104 in response to the drag input 1260. The other electronic apparatus 104 may provide a guide dividing the display 1200 into a first region 1240 and a second region 1250 during the providing of the drag input 1260.

When the drag input 1260 is released, the electronic apparatus 101 may divide the display 150 into a first region 1270 and a second region 1280. For example, when the drag input 1260 is released in the first region 1240 of the display 1200 of another electronic apparatus 104, the electronic apparatus 101 may display an execution screen of the third function corresponding to the notification message 1230 on the first region 1270 corresponding to a point at which the drag input 1260 is released, among the divided regions of the display 150. Further, the electronic apparatus 101 may display an execution screen of the first function on the remaining second region 1280 of the display 150. The other electronic apparatus 104 may display an execution screen of the second function on the display 1200.

FIG. 13 illustrates a flowchart illustrating a screen display method of an electronic apparatus by using another electronic apparatus according to an embodiment of the present disclosure.

Referring to FIG. 13, the electronic apparatus 101 may execute a first function and display a first function execution screen through the display, and another electronic apparatus 104 may execute a second function and display a second function execution screen through the display in operation 1310. The electronic apparatus 101 and the other electronic apparatus 104 may be connected, for example, by wireless or wired communication.

The electronic apparatus 101 or the other electronic apparatus 104 may receive a notification message from an external device, for example, a server or another electronic apparatus, or internally generate a notification message in operation 1320. The notification message may include at least one of, for example, an image, text, or content. The other electronic apparatus 104 may display the notification message on at least a part of the screen of the display. The other electronic apparatus 104 may receive the notification message received by the electronic apparatus 101 from the outside and/or the internally generated notification message through the network and display the received the notification message.

The other electronic apparatus 104 may detect a drag input for the notification message in operation 1330. The drag input may be an input by a direct touch or an input by hovering for the notification message.

When the drag input is released, the electronic apparatus 101 may divide the screen of the display into two or more regions in operation 1340. For example, when the drag input is released, another electronic apparatus 104 may transmit function execution information and location-related information to the electronic apparatus 101. The function execution information may include information related to the execution of a third function related to the notification message. The location-related information may include information about a location at which the drag input is released. When the electronic apparatus 101 receives the function execution information from another electronic apparatus 104, the electronic apparatus 101 may divide the screen of the display into two or more regions. When the electronic apparatus 101 is set to vertically divide the screen, the screen of the display may be vertically divided.

When the function execution information is received, the electronic apparatus 101 may display an execution screen of the third function executed in relation to the notification message in the first region corresponding to the received location-related information among the divided regions in operation 1350. The location-related information includes the information about the location at which the drag input is released, so that the first region may correspond to a location at which the drag input is released.

The electronic apparatus 101 may display a displayed first function execution screen on a second region, except for the first region, among the divided regions in operation 1360.

Figure 14:
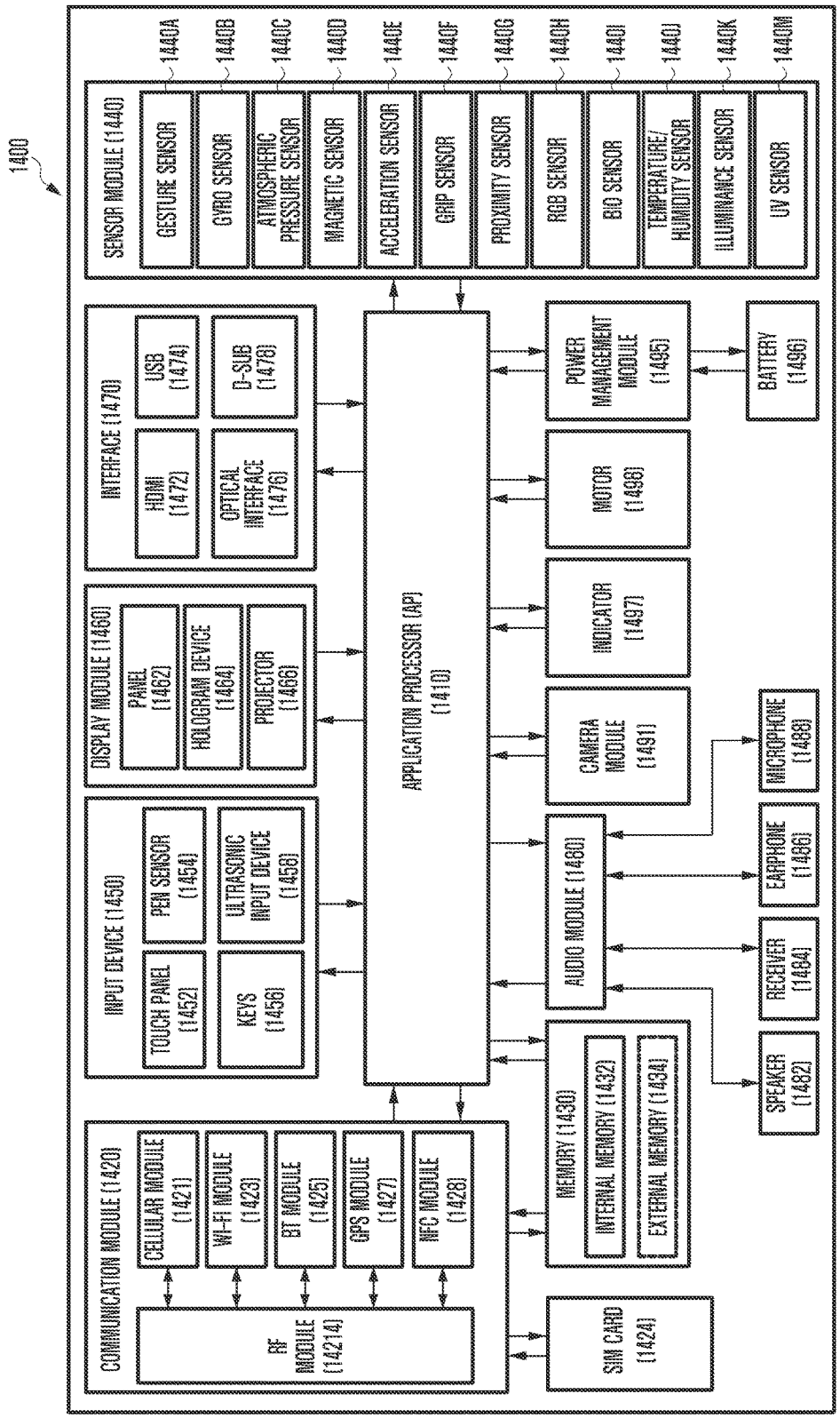
FIG. 14 is a block diagram of an electronic apparatus according to an embodiment of the present disclosure.

FIG. 14 illustrates a block diagram of an electronic device according to various embodiments of the present disclosure. The electronic device 1400, for example, may constitute all or a part of the electronic device 101 shown in FIG. 1.

Referring to FIG. 14, the electronic device 1400 may include at least one application processor (AP) 1410, a communication module 1420, at least one subscriber identity module (SIM) card 1424, a memory 1430, a sensor module 1440, an input module 1450, a display 1460, an interface 1470, an audio module 1480, a camera module 1491, a power management module 1495, a battery 1496, an indicator 1497, and a motor 1498.

The AP 1410 may drive an operating system or an application program to control a plurality of hardware or software components connected to the AP 1410, and may perform processing and operations of various data including multimedia data. The AP 1410, for example, may be implemented as a system on chip (SoC). The AP 1410 may further include a graphic processing unit (GPU) (not shown).

The communication module 1420 (e.g., the communication interface 160) may perform data transmission/reception in communication with other electronic devices (e.g., the electronic device 104 and the server 106) connected to the electronic device 1400 (e.g., the electronic device 101) through a network. According to an embodiment, the communication module 1420 may include a cellular module 1421, a Wi-Fi module 1423, a BT module 1425, a GPS module 1427, an NFC module 1428, and a radio frequency (RF) module 1429.

The cellular module 1421 may provide a voice call, a video call, an SMS service, an Internet service, and the like through a communication network (e.g., LTE, LTE-A, CDMA, WCDMA, UMTS, WiBro, or GSM). Also, the cellular module 1421 may identify and authenticate an electronic device in a communication network by using, for example, a subscriber identification module (e.g., the SIM card). According to an embodiment of the present disclosure, the cellular module 1421 may perform at least some of the functions that may be provided by the AP 1410. For example, the cellular module 1421 may perform at least a multimedia control function.

According to an embodiment of the present disclosure, the cellular module 1421 may include a communication processor (CP). Further, the cellular module 1421, for example, may be implemented as an SoC. Although the cellular module 1421 (e.g., a CP), the memory 1430, the power management module 1495, and the like are shown as separate elements from the AP 1410 in FIG. 14, the AP 1410 may be implemented to include at least some (e.g., the cellular module 1421) of the aforementioned elements according to an embodiment.

According to an embodiment of the present disclosure, the AP 1410 or the cellular module 1421 (e.g., a CP) may load a command or data received from at least one of a non-volatile memory and other elements connected thereto into a volatile memory and process the loaded command or data. Further, the AP 1410 or the cellular module 1421 may store data received from or generated by at least one of other elements in a non-volatile memory.

Each of the Wi-Fi module 1423, the BT module 1425, the GPS module 1427, and the NFC module 1428 may, for example, include a processor for processing data transmitted or received through the corresponding module. Although the cellular module 1421, the Wi-Fi module 1423, the BT module 1425, the GPS module 1427, and the NFC module 1428 are shown as separate blocks in FIG. 14, at least some (e.g., two or more) of the cellular module 1421, the Wi-Fi module 1423, the BT module 1425, the GPS module 1427, and the NFC module 1428 may be included in one integrated chip (IC) or one IC package according to an embodiment. For example, at least some of processors corresponding to the cellular module 1421, the Wi-Fi module 1423, the BT module 1425, the GPS module 1427, and the NFC module 1428 respectively (e.g., a CP corresponding to the cellular module 1421 and a Wi-Fi processor corresponding to the Wi-Fi module 1423) may be implemented as one SoC.

The RF module 1429 may perform data transmission/reception, for example, RF signal transmission/reception. Although not shown in the drawing, the RF module 1429, for example, may include a transceiver, a power amp module (PAM), a frequency filter, a low noise amplifier (LNA), and the like. Also, the RF module 1429 may further include a component for transmitting/receiving an electromagnetic wave over the air in wireless communication, such as a conductor or a conducting wire. Although FIG. 14 shows that the cellular module 1421, the Wi-Fi module 1423, the BT module 1425, the GPS module 1427, and the NFC module 1428 share one RF module 1429, at least one of the cellular module 1421, the Wi-Fi module 1423, the BT module 1425, the GPS module 1427, and the NFC module 1428 may perform RF signal transmission/reception through a separate RF module according to an embodiment.

The at least one SIM card 1424 may be a card including a subscriber identification module, and may be inserted into at least one slot formed in a certain position of the electronic device. The at least one SIM card 1424 may include unique identification information (e.g., integrated circuit card identifier (ICCID)) or subscriber information (e.g., international mobile subscriber identity (IMSI)).

The memory 1430 (e.g., the memory 130) may include an internal memory 1432 or an external memory 1434. The internal memory 1432, for example, may include at least one of a volatile memory (e.g., a dynamic random access memory (DRAM), a static RAM (SRAM), or a synchronous dynamic RAM (SDRAM)) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, or a not or (NOR) flash memory).

According to an embodiment of the present disclosure, the internal memory 1432 may be a solid state drive (SSD). The external memory 1434 may further include a flash drive, for example, a compact flash (CF), a secure digital (SD), a micro-SD, a mini-SD, an extreme digital (xD), or a memory stick. The external memory 1434 may be functionally connected to the electronic device 1400 through various interfaces. According to an embodiment of the present disclosure, the electronic device 1400 may further include a storage device (or storage medium) such as a hard drive.

The sensor module 1440 may measure a physical quantity or detect an operation state of the electronic device 1400 and convert the measured or detected information into an electronic signal. The sensor module 1440 may, for example, include at least one of a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., a red, green and blue (RGB) sensor), a biometric sensor 1440I, a temperature/humidity sensor 1440J, a light sensor 1440K, and a ultraviolet (UV) sensor 1440M. Additionally or alternatively, the sensor module 1440, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 1440 may further include a control circuit for controlling one or more sensors included therein.

The input module 1450 may include a touch panel 1452, a (digital) pen sensor 1454, a key 1456, or an ultrasonic input unit 1458. The touch panel 1452 that recognizes a touch input, for example, may include at least one of a capacitive touch panel, a resistive touch panel, an IR touch panel, and an acoustic wave touch panel. Also, the touch panel 1452 may further include a control circuit. When the touch panel 1452 is a capacitive touch panel, the touch panel 1452 may recognize a physical contact or proximity. The touch panel 1452 may also further include a tactile layer. In this case, the touch panel 1452 may provide a tactile response to a user.

The (digital) pen sensor 1454, for example, may be implemented using a means identical or similar to a means for receiving a touch input from a user or using a separate recognition sheet. The key 1456, for example, may include a physical button, an optical key, or a keypad. The ultrasonic input unit 1458 is a unit that can identify data by generating an ultrasonic signal through an input tool and detecting a sonic wave through a microphone in the electronic device 1400, and is capable of wireless recognition. According to an embodiment of the present disclosure, the electronic device 1400 may also receive a user input from an external device (e.g., computer or server) connected thereto by using the communication module 1420.

The display 1460 (e.g., the display 150) may include a panel 1462, a hologram unit 1464, or a projector 1466. The panel 1462, for example, may be a liquid crystal display (LCD) or an active matrix-organic light emitting diode (AM-OLED). The panel 1462, for example, may be implemented to be flexible, transparent, or wearable. The panel 1462 may also be incorporated into one module together with the touch panel 1452. The hologram unit 1464 may show a stereoscopic image in the air by using light interference. The projector 1466 may display an image by projecting light onto a screen. The screen, for example, may be located inside or outside of the electronic device 1400. According to an embodiment of the present disclosure, the display 1460 may further include a control circuit for controlling the panel 1462, the hologram unit 1464, or the projector 1466.

The interface 1470, for example, may include a HDMI 1472, an USB 1474, an optical interface 1476, or a D-sub-miniature (D-sub) 1478. The interface 1470, for example, may be included in the communication interface 160 shown in FIG. 1. Additionally or alternatively, the interface 1490, for example, may include a mobile high-definition link (MHL) interface, an SD card/multimedia card (MMC) interface, or an infrared data association (IrDA) interface.

The audio module 1480 may provide bidirectional conversion between a sound and an electronic signal. At least some elements of the audio module 1480, for example, may be included in the input/output interface 140 shown in FIG. 1. The audio module 1480, for example, may process sound information input or output through a speaker 1482, a receiver 1484, earphones 1486, or the microphone 1488.

The camera module 1491 is a device that can take both still and moving images, and may include one or more image sensors (e.g., a front sensor or a rear sensor, not shown), a lens (not shown), an image signal processor (ISP) (not shown), or a flash (e.g., an LED or xenon lamp, not shown).

The power management module 1495 may manage power of the electronic device 1400. Although not shown, the power management module 1495, for example, may include a power management integrated circuit (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment of the present disclosure, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge may measure, for example, the residual capacity, charge in voltage, current, or temperature of the battery 1496. The battery 1496 may store or generate electricity, and may supply power to the electronic device 1400 by using the stored or generated electricity. The battery 1496 may include a rechargeable battery or a solar battery.

The indicator 1497 may display a specific status of the electronic device 1400 or a part thereof (e.g., the AP 1410), for example, a boot-up status, a message status, or a charging status. The motor 1498 may convert an electrical signal into a mechanical vibration. Although not shown, the electronic device 1400 may include a processing unit (e.g., GPU) for supporting a mobile TV. The processing unit for supporting a mobile TV may process media data pursuant to a certain standard, for example, digital multimedia broadcasting (DMB), digital video broadcasting (DVB), or media flow.

Each of the above described elements of the electronic device according to the present disclosure may be formed by one or more components, and the names of the corresponding elements may vary according to the type of the electronic device. The electronic device according to the present disclosure may include at least one of the above described elements, and may exclude some of the elements or further include other additional elements. Further, some of the elements of the electronic device according to the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations, which are now known or will be developed in the future.

According to various embodiments of the present disclosure, at least some of the devices (e.g., modules or functions thereof) or the method (e.g., operations) according to the present disclosure may be implemented by a command stored in a computer-readable storage medium in a programming module form. When the instruction is performed by at least one processor (e.g., the processor 120), the at least one processor may perform a function corresponding to the instruction. The computer-readable storage medium may be, for example, the memory 130. At least some of the programming modules may be implemented (e.g., executed) by, for example, the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction (e.g., programming module), such as a ROM, a RAM, a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic apparatus, the method comprising:
 displaying, by the electronic apparatus including a display, a first application execution screen on the display of the electronic apparatus;
 displaying, by the electronic apparatus, a notification message window overlaid on at least part of the first application execution screen while the first application execution screen is displayed;
 detecting, by the electronic apparatus, a touch or hovering at a first location on or around the notification message window;
 detecting, by the electronic apparatus, a movement of the touch or the hovering;
 detecting a second location at which the movement is ended; and
 transmitting information related to the movement from the electronic apparatus to an external apparatus, wherein the external apparatus is connected with the electronic apparatus through a network and the external apparatus is for displaying a second application execution screen in relation to a notification message on a divided screen of a display of the external apparatus based on the information related to the movement,
 wherein the information related to the movement comprises execution information related to the notification message, and location-related information corresponding to the second location, and
 wherein the screen of the display of the external apparatus is divided into two or more regions in response that the movement is ended.

2. The method of claim 1, wherein the displaying of the notification message window comprises displaying at least one of an image, text, or content corresponding to a notification received through a communication unit and/or internally generated on the electronic apparatus.

3. The method of claim 1,
 wherein the display of the electronic apparatus includes:
  a first side,
  a second side that is substantially vertical to the first side,
  a third side that is substantially vertical to the second side and is substantially parallel to the first side, and
  a fourth side that is substantially vertical to the third side and is substantially parallel to the second side, and
 wherein, when the first location is substantially located at a center portion of the display and the second location is located between the first location and the first side, a portion on which the second application execution screen of the external apparatus is displayed corresponds to a portion surrounded by the first side, a half of the second side closest to the first side, and a half of the fourth side closest to the first side.

4. The method of claim 1, wherein the displaying of the notification message window includes displaying items of a plurality of application programs related to the notification message.

5. The method of claim 4,
 wherein the first location includes a location, at which the items of the plurality of application programs are displayed, and
 wherein the displaying of the second application execution screen on the divided screen of the display of the external apparatus includes displaying a user interface of an application program selected by the touch or the hovering among the items of the plurality of application programs.

6. A method of operating an electronic apparatus, the method comprising:
 displaying, by the electronic apparatus including a first display, a first application execution screen on the first display;
 receiving, by the electronic apparatus, information related to a movement of a touch or hovering on a second display of an external apparatus from the external apparatus, the information related to the movement comprising second application execution information related to the touch or hovering and a second location at which the movement is ended;

dividing a screen of the first display into two or more portions in response that the movement on the second display of the external apparatus is ended; and displaying the first application execution screen on one divided portion of the screen of the first display and a second application execution screen on another divided portion of the screen of the first display, based on the information related to the movement, wherein the second application execution screen corresponds to the second application execution information.

7. An electronic apparatus comprising:
an input unit configured to detect a touch or a hovering;
a display configured to output a screen;
a communication unit configured to establish a network with an external apparatus; and
a control module configured to:
    display, by the electronic apparatus including a display, a first application execution screen on the display of the electronic apparatus,
    display a notification message window overlaid on at least part of the first application execution screen while the first application execution screen is displayed,
    detect a touch or hovering at a first location on or around the notification message window,
    detect a movement of the touch or the hovering,
    detect a second location, at which the movement is ended, and
    transmit information related to the movement from the electronic apparatus to the external apparatus, wherein the external apparatus is connected with the electronic apparatus through a network and the external apparatus is for displaying a second application execution screen in relation to a notification message on a divided screen of a display of the external apparatus based on the information related to the movement,
wherein the information related to the movement comprises execution information related to the notification message, and location-related information corresponding to the second location, and
wherein the screen of the display of the external apparatus is divided into two or more regions in response that the movement is ended.

8. The electronic apparatus of claim 7, wherein the control module displays the notification message window including at least one of an image, text, or content corresponding to a notification received through the communication unit and/or internally generated on the electronic apparatus.

9. The electronic apparatus of claim 7,
wherein the display of the external apparatus includes:
    a first side,
    a second side that is substantially vertical to the first side,
    a third side that is substantially vertical to the second side and is substantially parallel to the first side, and
    a fourth side that is substantially vertical to the third side and is substantially parallel to the second side, and
wherein, when the first location is substantially located at a center portion of the display, and the second location is located between the first location and the first side, a portion, on which the second application execution screen of the external apparatus is displayed, corresponds to a portion surrounded by the first side, a half of the second side closest to the first side, and a half of the fourth side closest to the first side.

10. The electronic apparatus of claim 7, wherein the control module displays the notification message window comprising items of a plurality of application programs related to the notification message.

11. The electronic apparatus of claim 10,
wherein the first location includes a location at which the items of the plurality of application programs are displayed, and
wherein the control module displays the second application execution screen on the divided screen of the display of the external apparatus in a way of a user interface of an application program selected by the touch or the hovering among the items of the plurality of application programs on a portion corresponding to the second location among the divided portions.

12. The electronic apparatus of claim 7, wherein the communication unit transmits a notification received from an external device and/or an internally generated notification to the external apparatus.

13. The electronic apparatus of claim 7,
wherein the display of the electronic apparatus includes one or more displays, and
wherein the control module displays the notification message window on a part of at least one display among the one or more displays.

14. The electronic apparatus of claim 13, wherein the control module detects a touch or hovering at a first location on or around the region displayed on any one display among the one or more displays, detects a movement of the touch or the hovering, and detects a second location at which the movement is ended.

15. The electronic apparatus of claim 14, wherein the control module divides a screen of a predetermined display among the one or more displays into two or more portions, and displays a user interface of an application program related to at least one of the image, the text, or the content on a portion corresponding to the second location among the divided portions.

* * * * *